(12) United States Patent
Yoo

(10) Patent No.: US 6,768,827 B2
(45) Date of Patent: Jul. 27, 2004

(54) INTEGRATED OPTICAL ROUTER

(75) Inventor: Sung-Joo Ben Yoo, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 120 days.

(21) Appl. No.: 10/081,396

(22) Filed: Feb. 22, 2002

(65) Prior Publication Data

US 2003/0133641 A1 Jul. 17, 2003

Related U.S. Application Data

(60) Provisional application No. 60/349,090, filed on Jan. 16, 2002.

(51) Int. Cl.[7] ............................. G02B 6/12; G02B 6/28; G02B 6/293; G02B 6/34; G02B 6/124
(52) U.S. Cl. ............................. 385/14; 385/24; 385/16; 385/37; 398/43; 398/45; 398/48; 398/49; 398/50; 398/51; 398/55; 398/56; 398/57
(58) Field of Search ............................. 385/14, 24, 16, 385/37; 398/43, 45, 46, 48–51, 55–57, 79, 82, 87

(56) References Cited

U.S. PATENT DOCUMENTS

| 5,600,742 | A | * | 2/1997 | Zirngibl | 385/37 |
|---|---|---|---|---|---|
| 5,617,234 | A | * | 4/1997 | Koga et al. | 398/14 |
| 5,764,821 | A | * | 6/1998 | Glance | 385/14 |
| 5,802,232 | A | | 9/1998 | Bhat et al. | 385/122 |
| 5,825,517 | A | | 10/1998 | Antoniades et al. | 359/117 |
| 5,881,079 | A | * | 3/1999 | Doerr et al. | 372/20 |
| 5,937,117 | A | * | 8/1999 | Ishida et al. | 385/24 |
| 6,278,813 | B1 | * | 8/2001 | Takada et al. | 385/24 |
| 6,288,808 | B1 | * | 9/2001 | Lee et al. | 398/49 |
| 6,493,117 | B1 | | 12/2002 | Milton et al. | 359/124 |
| 6,522,803 | B1 | * | 2/2003 | Nakajima et al. | 385/24 |
| 6,542,655 | B1 | * | 4/2003 | Dragone | 385/17 |
| 6,549,313 | B1 | * | 4/2003 | Doerr et al. | 359/128 |
| 2002/0015551 | A1 | * | 2/2002 | Tsuyama et al. | 385/17 |
| 2002/0071152 | A1 | | 6/2002 | Blumenthal | 359/123 |

OTHER PUBLICATIONS

Hluchyj et al., "Queuing in High–Performance Packet Switching," IEEE Journal on Selected Areas in Communications, vol. 6, No. 9. Dec. 1988, pp. 1587–1597.

Hunter et al., "Buffering in Optical Pack Switches," Journal of Lightwave Technology, vol. 16, No. 12, Dec. 1998, pp. 2081–2094.

Yao et al., "All–Optical Packet Switching for Metropolitan Area Networks: Opportunities and Challenges," IEEE Communications Magazine, Mar. 2001, pp. 142–148.

(List continued on next page.)

Primary Examiner—John D. Lee
Assistant Examiner—Daniel Valencia
(74) Attorney, Agent, or Firm—Park, Vaughan, & Fleming, LLP

(57) ABSTRACT

An optical router integrated in an InP-based substrate bonded to a single thermo-electric cooler for packet-based networks utilizing wavelength-division multiplexing (WDM) on silica fibers. Input and output arrayed waveguide gratings (AWGs) respectively demultiplex and multiplex the WDM signals to and from multiple transmission fibers. Input and output wavelength converters are connected between the input and outputs AWGs and a switching AWG. The output converts may include a tunable laser and interferometer formed in the same substrate. The header information is preferably carried out-of-channel from the WDM data signals, either in the same fiber band or a different one. Photodetectors and laser diodes are formed in the same substrate. Fast RF electronics are formed in GaAs chips and slower electronics formed in a silicon chip are bonded to the InP wafer

22 Claims, 19 Drawing Sheets

OTHER PUBLICATIONS

Zhong et al., "A New Wavelength–Routed Photonic Packet Buffer Combining Traveling Delay Lines with Delay–Line Loops," Journal of Lightwave Technology, vol. 19, No. 8, Aug. 2001, pp. 1085–1092.

Chia et al., "Packet Loss and Delay Performance of Feedback and Feed–Forward Arrayed–Waveguide Gratings-Based Optical Packet Switches with WDM Inputs–Outputs," Journal of Lightwave Technologies, vol. 19, No. 9, Sep. 2001, pp. 1241–1254.

O. Painer et al., "Two–dimensional photonic band–gap defect mode laser", *Science Maganize*. vol. 284, pp. 1–6, Jun. 1999.

C. C. Phillips et al., "Physica e: low–dimensional systems and nanostructures", *Elsevier Science B.V.*, vol. 7, issues 1–2, Apr. 2000, pp. 166–173.

* cited by examiner

INTEGRATED OPTICAL ROUTER

RELATED APPLICATION

This application claims benefit of provisional application No. 60/349,090, filed Jan. 16, 2002 and entitled CHIP-SCALE OPTICAL ROUTER, Express Mail No. EK887108288US.

BACKGROUND OF THE INVENTION

1. Field of the Invention

The invention relates generally to switches used in communications networks. In particular, it relates to optical routers.

2. Background Art

The advancement of telecommunications technology over the past two decades has included two significant developments: (1) large, high-capacity networks based on packet switching; and, (2) optical fiber transmission media and in particular silica fiber and the use of wavelength division multiplexing to further increase the fiber bandwidth. Combining the two has presented some difficulties.

There are several types of commercially important packet networks. Asynchronous transfer mode (ATM) was developed in the telephone industry and is based on ATM cells having a fixed length of 53 bytes. Multiple ATM cells are identified to a virtual communications circuit.

Another type of network assuming greater importance and being implemented in many environments is related to the Internet communications network based on the TCP/IP protocol. The TCP/IP protocol applies to many levels of communications networks, but some of the most challenging applications involve the switched connections between different computer networks. An Internet-type of communications network 10, as schematically illustrated in FIG. 1, connects multiple terminals 12 through nodes 14 interconnected by bi-directional communications links 16. The terminals 12 can be considered to be ports to other, perhaps different, types of computer networks. The nodes 14 are based on routers which can route sequentially received frames in different directions as the frame propagates through the network 10 from the source terminal 12 to the destination terminal 12. The preferred term for packets is a frame 18, which as illustrated in FIG. 2, is composed for a serial link of a header 20 and an immediately following data payload 22. That is, the header 20 and payload 22 are time multiplexed. The header 20 contains among other items a destination for the frame 18. The data payload 22 is often of variable length, in which case the header 20 includes an indication of the length, but the overall frame is relatively short, on the order of a few hundred bytes. Sometimes a trailer is included to mark the end of the frame.

Although much of the following description is based on the multiply connected fiber network of FIG. 1 and with the routers being based at the nodes 14, the invention can be used with other types of networks, and routers are used in yet other configurations. In one example, the links may be of different forms linking different types of nodes, including satellites, airplanes, and complexly connected systems of multiple computers. In a second type of networks, as illustrated in the network diagram of FIG. 3, an inter-connected ring network 26 includes multiple bi-directional rings 28a, 28b, 28c, each including two counter-propagating optical fibers 30, 32, which provide redundant paths in case the pair of fibers 30, 32 is cut at any one point. That is, the rings 28 are survivable. Terminals 34 are connected to the respective rings 28 through nodes 36. Cross connects 38 link different ones of the rings 28. In a more realistic telephone or data network, a cross connect 38 may link more than two rings at a central communications hub.

Each of the rings 28 is typically controlled fairly tightly. A ring network which uses optical fiber for the transmission medium may employ wavelength division multiplexing (WDM), in which a single fiber conveys multiple optical carriers impressed with different data signals. In a WDM environment, packets between different pairs of terminals 34 on the same ring 28 may be identified and switched according to optical wavelength. However, such tight control becomes difficult for switching signals through the cross connects 38 between different rings 28. A packet switched system typically then requires that the cross connects 38 interrogate the frame header and switch only those frames destined to go outside of the originating ring 28. That is, the inter-ring cross-connects are advantageously based on routers. For a WDM environment, the cross-ring switching also strongly needs translation between WDM wavelengths to allow reuse of wavelengths and prevent undue constraints on routing and timing. It is also possible that the intra-ring nodes 36 are based on routers which extract from the ring 28 only those frames destined for the associated terminal 34. Further, the terminals 34 (or terminals 12 of FIG. 1) may represent an interface to a local network, such as an Ethernet network, in which only some of the packets need to be transferred from the local network onto the ring 28, for possible retransmission to yet other rings. Thus, the terminal 34 may additionally incorporate a router to transfer only selected ones of the packets that it receives from within the local network.

Returning to FIG. 1, the original TCP/IP networks were based on high-speed digital electrical links 16, on which the frames 18 are transmitted in sequential fashion. A router receives a frame 18 on an incoming link 16, determines from the header 20 where the frame 18 should go, and accordingly retransmits the entire frame 18 onto the desired outgoing link 16. Typically, the received frame is stored in a memory, called a buffer, which allows time for the router to determine from lookup tables which outgoing link corresponds to the destination address. The robustness of the Internet derives from the fact that the nodes 14 are nearly autonomous with very little central control and from the further fact that multiple paths usually exist between the source and destination terminals. In such a loosely controlled network, frames arrive at a node 14 at nearly random times with nearly arbitrary destinations. In particular, two or more frames may arrive nearly simultaneously on different incoming links and require switching to the same outgoing link. The buffer allows for temporary storage of frames awaiting retransmission on a busy link.

The data rate for a network based on electrical links is typically determined by the operating frequency of the electronic routers and their associated electronic receivers and transmitters. At present, the maximum data rate for commonly used electronic systems is about 10 gigabits per second (Gb/s) although 40 Gb/s systems are being developed. Further increases will prove difficult. A 10 Gb/s transmission link conveys a 500 byte frame (each byte being 8 bits) in 400 ns. Since packets need to be individually switched, packet switching times should be substantially less than this time in order to not impact transmission capacity.

Optical fiber presents many advantages in communications network including speed, cost, security, and noise immunity. As originally applied to networks, a fiber was used to carry in one of the fiber transmission bands a single optical signal that had been modulated by an electronic data signal. In a point-to-point system, each link of the network included optical receivers and transmitters including electro-optical (E/O converters at the respective nodes interconnected by an optical fiber. Three commonly used transmission bands extend over wavelengths in the neighborhoods of 850 nm, 1310 nm, and 1550 nm. The 1310 nm band is typically interpreted as extending from 1290 to 1330 nm, and the 1550 nm band extends from 1520 to 1580 nm. The 1310 nm band is usually used in local networks because of its low frequency dispersion and hence high data rates while the 1550 nm band is favored in long distance networks because of its lower absorption. The 850 nm band extending from 800 to 900 nm is also available for less extended networks. The wavelengths between the bands are generally not usable because of excessive fiber absorption. Efforts are continuing to expand the widths of these bands. Optical fibers of other compositions have other transmission bands, but non-silica fibers have little commercial importance at this time.

Although the intrinsic transmission bandwidth of silica fiber in any of these bands is vast, often measured in hundreds of terahertz, the system speed is limited by the speed of the electronics associated with the routers and its transmitters and receivers, that is, about 10 Gb/s. However, the network data rates can be significantly increased by the use of wavelength division multiplexing (WDM) in which a single fiber conveys multiple optical carriers of different optical wavelengths $\lambda_1-\lambda_W$ in one or more of its transmission bands, and each wavelength carrier is impressed with a different data signal. An example of a WDM communication system includes forty or more wavelength channels (W≧40) with wavelength spacings at 1550 nm of about 1 nm or less. Thereby, the fiber transmission capacity is increased by a factor of forty.

The technology for the optical receivers and transmitters is readily available. Multiple semiconductor lasers of different emission wavelengths can be fabricated on one chip to have different emission wavelengths, the outputs of which are modulated according to the different respective data signals. An optical multiplexer combines the multiple optical signals and couples the multi-wavelength signal onto the fiber. At the receiver, the typically passive optical demultiplexer separates the different wavelength components, which respective optical detectors then convert to electrical form at data rates of no more than 10 Gb/s and ready for electronic switching. Optical multiplexers and demultiplexers are available that are essentially insensitive to data rate.

However, an electronically based router applied to the WDM fiber environment with E/O conversion between the fiber and the electronics does not scale well. Assume that K multi-wavelength router input ports are connected to K multi-wavelength router output ports and that there are W WDM wavelengths. For a system with 4 input ports and 32 wavelengths operating at 10 Gb/s, the total aggregate switching capacity needs to be 1.28 terabits per second (Tb/s). In the above design, each node or router requires KW electronically based optical transmitters and KW electronically based optical receivers. Further, a non-blocking electronic switch needs to connect any input port to any output port, for example, as implemented in a Clos switching network having multiple stages of parallel routers. As a result, its power and complexity increase as $(KW)^2$. It has been estimated that an electronic router incorporating the current state of the art in the above 1.28 Tb/s switch would require 54 bays of electronics weighing over 4000 kg and consuming 400 kW of power, including more than 1200 thermoelectric coolers for the very temperature-sensitive optoelectronics.

Electronically based routers suffer the further disadvantage that the optical-to-electronic conversion and complementary electronic-to-optical conversion is based on a particular format, for example, either TCP/IP or ATM with a digital payload. There are applications in which it is desired to have different formats on different channels, for example, different digital format on different channels, or digital payloads on some channels and analog or mixed analog/digital payloads on other channels. Even within a single WDM channel, it is desirable that the format of different packets be freely chosen. While it is conceivable to design an electronic router with this flexibility, it is advantageous that the router be concerned only with the packet routing and not with the format of the payload. Insensitivity to the payload format allows proprietary formats to be used on a public network without knowledge at the router of the payload format. As a result, it is desirable that a router not decode the payload portion of a switched packet.

All-optical WDM communication networks have been proposed in which signals are switched at each of the nodes according to the wavelength of the optical carrier. Such a network is largely passive away from the terminals and can thus be made relatively small and inexpensively. The network is transparent from transmitter to receiver and is thus insensitive to protocol. However, while components are available which can reconfigure the wavelength connections, the reconfiguration typically requires hundreds of milliseconds and thus is clearly incompatible with the very short TCP/IP and ATM frames. Furthermore, the wavelengths need to be allocated for the system as a whole depending upon traffic. Such centralized control runs counter to the autonomous nature of the many nodes of the Internet.

I have described the use of wavelength conversion for WDM networks in "Wavelength conversion technologies for WDM network applications," *Journal of Lightwave Technology*, vol. 14, no. 5, June 1996, pp. 955–966. However, the article emphasizes transparent networks in which channels are switched according to wavelength and does not explore optical packet switching.

SUMMARY OF THE INVENTION

An optical router for wavelength-division multiplex (WDM) signals allows the switching of payloads without their conversion to electrical form. The headers are decoded and processed to determine the optical switching route.

A multi-wavelength optical router may be implemented by input and output array waveguide gratings (AWGs) acting as demultiplexers and multiplexers. The signals from the input AWG have their wavelengths converted to reflect a routing path to the outputs. Output wavelength converters may be used to readjust the wavelengths for transmission over the network.

A preferred embodiment includes a switching AWG positioned between the input and output AWGs. Input wavelength converters are positioned on single-wavelength channels between the input and switching waveguides and the degree of wavelength conversion is set by a control section reading the headers of arriving packets. Output wavelength converters are positioned between the switching AWG and the output AWG to convert the wavelengths for transmission. Multiple input and output AWGs with associated wavelength converters may be connected through a single switching AWG.

The AWGs and waveguides linking the optical element may be formed in a single substrate, for example of InP. Additional opto-electronics may also be included in the same substrate. Alternatively, a few substrates may be formed with the different stages of the router and mounted on a common substrate carrier providing optical coupling between the substrates. In either case, the router may be mounted on a single thermoelectric cooler.

The wavelength converters may be implemented as Mach-Zehnder interferometers with controllable active regions, preferably reversed biased into avalanche, and tunable lasers. Preferably the Mach-Zehnder interferometer and tunable lasers are fabricated in the same substrate as the AWGs and waveguides.

The size of the switching AWG may be reduced by a multiple levels of AWGs of lesser size. Two stages of such multi-level routers reduce contention.

The packet header information is preferably carried out-of-channel on an optical carrier of differing wavelength than any of the carriers of the packet payload. Headers for some or all of the WDM channels may be carried on one signaling carrier by the use of multiple RF subcarriers impressed on the signaling optical carrier. However, two or more signaling carrier wavelengths may be use.

The out-of-channel signaling carrier may be in the same fiber band as the data carriers, for example, the 1550 nm band, or may be in a different fiber band, for, example, the 1310 nm band. A simple demultiplexer such as a multi-mode interference filter can separate out-of-band signaling from the data carriers. The input AWG may be used to separate in-band, out-of-channel signaling from the data carriers.

Out-of-channel signaling may be sent in advance of the corresponding payload to allow time for header reception and processing to immediate switch the payload when it arrives.

Alternatively, the payload may be optically stored or delayed while the header is being processed. Preferably, optical delay elements are interposed on the wavelength-separated optical paths between the input AWGs and the input wavelength converters.

One type of fixed or selective and controllable optical delay is implemented by a waveguide structure including multiple quantum wells and a photonic bandgap arrangement of periodically arranged holes and isolated defects, thereby providing extended optical trapping at the defects by electromagnetically induced transparency. Such a structure may be formed in the same substrate as the rest of the router, but it may be used for other purposes than optical routing.

Photodetectors and laser diodes for the out-of-channel signaling may be formed in the same substrate, for example of InP, as the AWGs. High-speed receiver and transmitter electronics may be formed in separate chips, for example, of GaAs and bonded to the InP substrate. Multiple receiver and transmitter chips may be closely positioned to their respective opto-electronics. Slower control electronics may be formed in a silicon chip that is bonded also to the InP chip. The bonding is preferably performed with flip-side solder bumps that additionally provide electrical contacts, or wire bonding may alternatively be used.

DETAILED DESCRIPTION OF THE PREFERRED EMBODIMENTS

Figure 1:
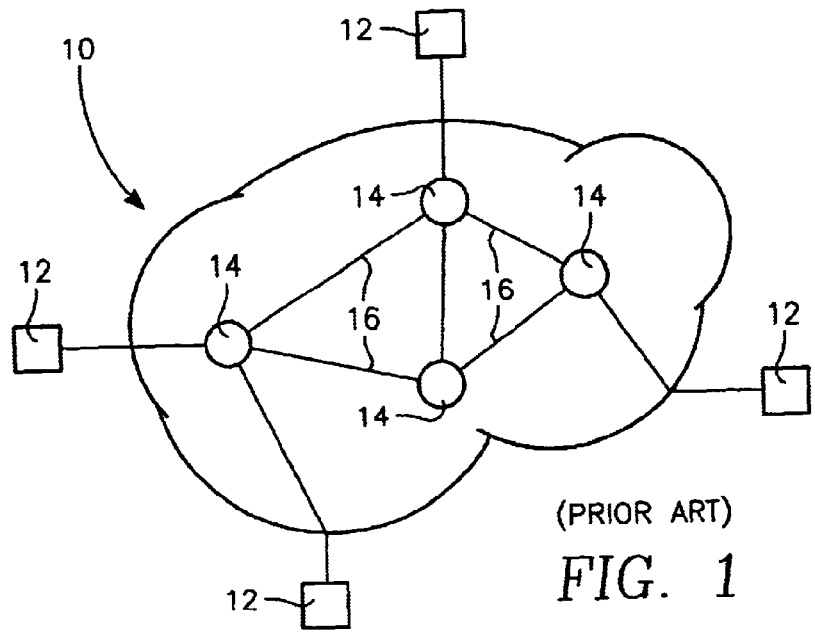
FIG. 1 is a network diagram of a multiply connected communications network.

The size, complexity, and cost of routers used in optical networks can be greatly decreased by the use of optical routers in which most of the transmitted frame, in particular, all the data payload, is maintained in optical form. Further, optical switching required in a wavelength division multiplexing (WDM) network is advantageously accomplished by selective wavelength conversion of optical carriers and by relying upon passive wavelength dependent optical switching elements. Further advantages are obtained when the major portions of the optical router are integrated on a single substrate.

In U.S. patent application Ser. No. 09/654,384 (hereinafter '384 application), filed Sep. 1, 2000, incorporated herein by reference in its entirety, I describe an optical router 40, schematically illustrated in the circuit diagram of FIG. 4, which is based on wavelength conversion. A plurality K of input fibers 42 or other types of optical communication paths carry respective multi-wavelength WDM signals having optical carriers of W respective wavelengths $\lambda_1 - \lambda_W$. The input fibers 42 are connected to respective optical demultiplexers 44 which separate the W wavelength components of each multi-wavelength WDM signal into W spatial paths according to wavelength. In the simplest embodiments, all the illustrated links are either optical fibers or planar optical waveguide formed in a substrate A selective, tunable input wavelength converter 46 receives a respective one of the separated wavelength components and converts its optical carrier to a selected and variable wavelength while maintaining the modulation of the optical signal. It is understood that in some switching states, the wavelength converter may effectively maintain the wavelength of the switched optical signal. The wavelength conversion is insensitive to the data being carried, and the modulation of the wavelength-converted signal can be digital, analog, or a combination thereof. The outputs of the wavelength converters 46 are connected to respective input ports of a WK×WK wavelength router 48, that is, one having WK input ports selectively connected to preferably any of WK output ports. The wavelengths of the input signals, as set by the input wavelength converters 46, are used to determine the switching paths through the wavelength router 48 to respective output ports. The wavelength router 48 is advantageously implemented as a passive optical device in an arrayed waveguide grating (AWG). A second set of output wavelength converters 50 receive the optical signals from the wavelength router outputs and convert them to wavelengths determined by output WDM signals. Optical multiplexers 52 receive the twice wavelength-converted optical signals and multiplex them onto respective output fibers 54 as W-wavelength WDM signals.

Figure 2:
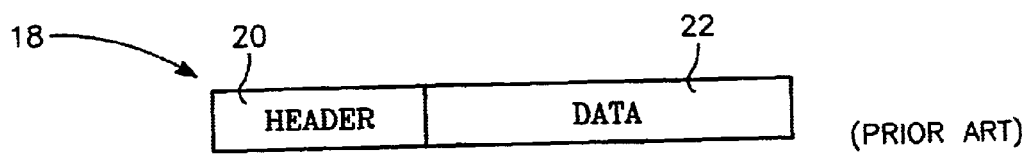
FIG. 2 displays the part of a TCP/IP frame.
Figure 3:
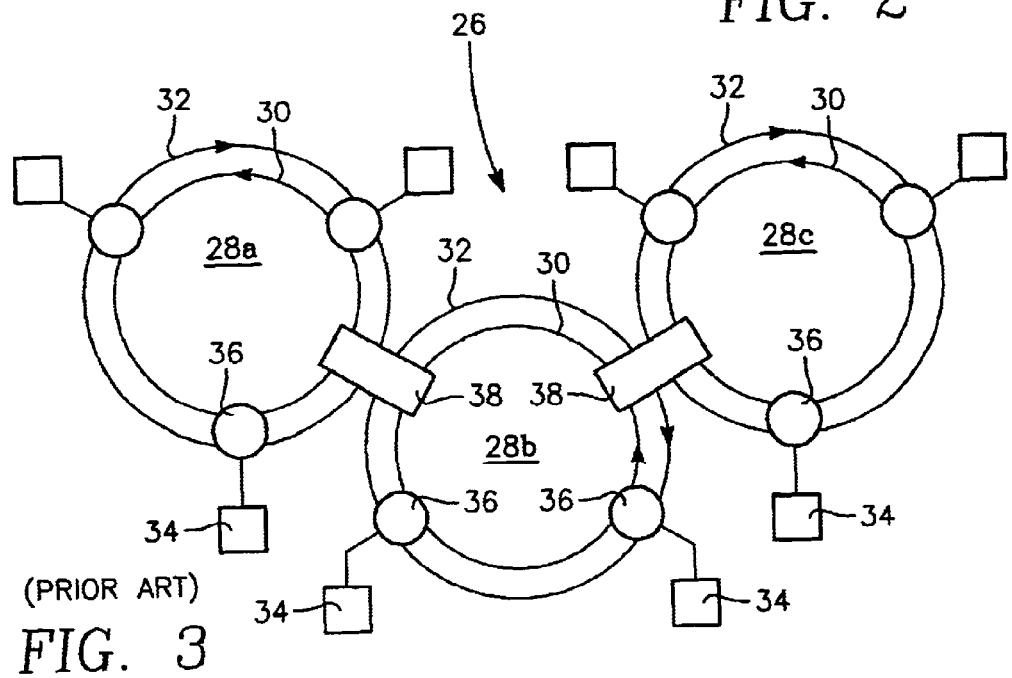
FIG. 3 is a network diagram of an interconnected ring network.
Figure 4:
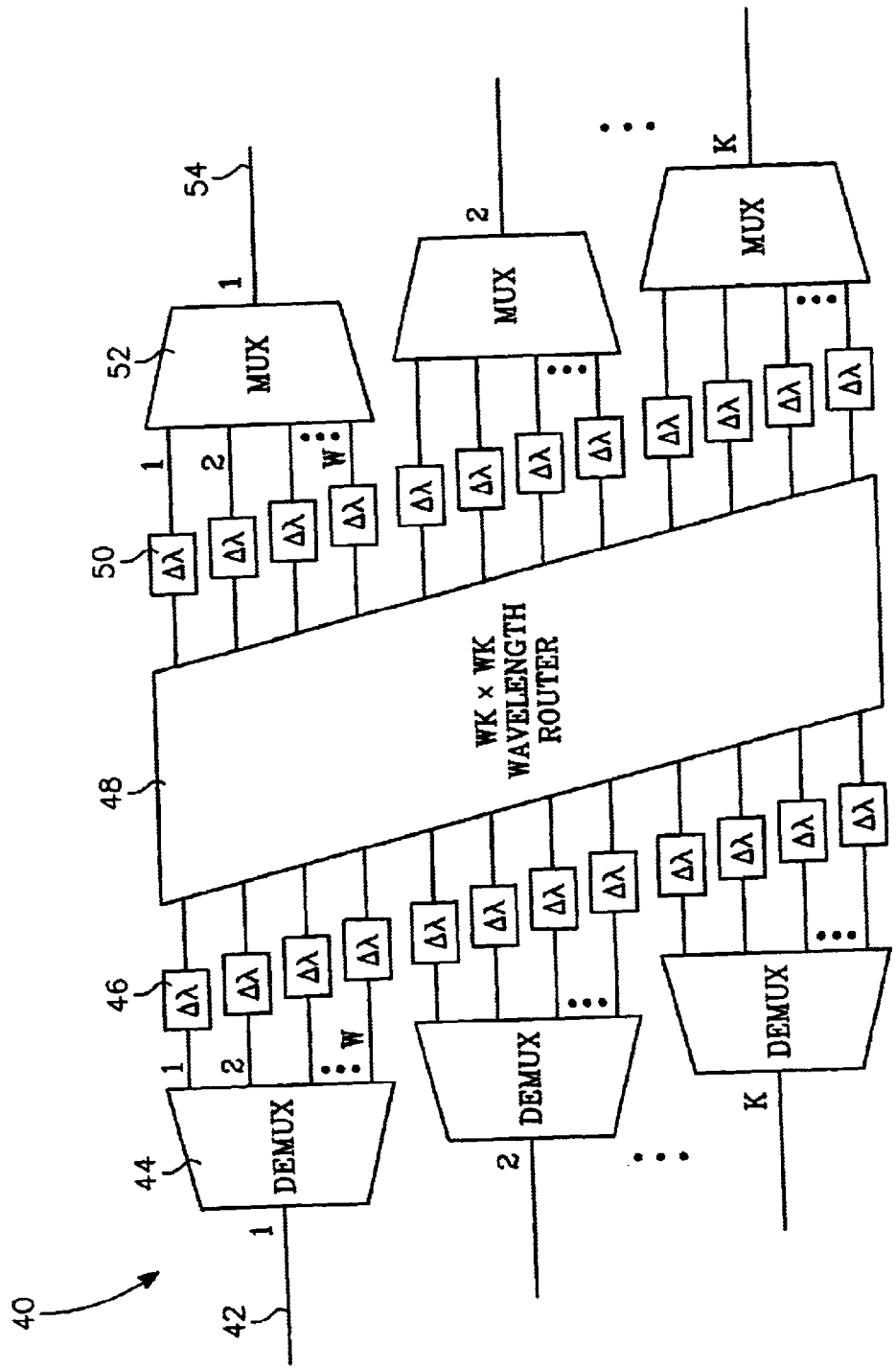
FIG. 4 is a functional diagram of the switching elements in an optical router of the invention.

The switching system of FIG. 4 is overly simplified in that it emphasizes the switching fabric and ignores the control system necessary to switch individual packets. In a more complete system 58 illustrated in FIG. 5, received signaling information related to the desired spatial switch direction of a packet is carried on out-of-channel subcarrier signal at a control wavelength $\lambda_C$ rather than in the same wavelength channels as the data at the WDM wavelengths $\lambda_1 - \lambda_W$. This is sometimes referred to as the Data Communications Channel (DCC). The out-of-channel signaling is distinguished over the in-channel signaling described in the '384 patent application. For an implementation based on subcarrier multiplexing (SCM), each of the WDM headers for a fiber 42 are impressed on the single optical control wavelength $\lambda_C$ by modulating the control optical carrier at $\lambda_C$ by multiple RF signals at RF frequencies $f_1 - f_W$ each identified with respective WDM channels. Other RF allocations are possible. The subcarrier modulation may be accomplished by mixing a 155 Mb/s digital header signal with a 14 GHz local oscillator. The mixed signal controls an electro-optical modulator at the output of a laser. RF subcarriers spaced at 500 MHz supports 200 Mb/s signaling per WDM channel. Subcarrier frequencies are spaced by fixing the controlled local oscillator frequencies, and then the multiple subcarrier signals containing multiple header information on multiple wavelength are electrically multiplexed before modulating a CW laser output. Other LO frequencies from 5 to 50 GHz are easily achievalbe to enable 200 to 500 MHz subcarrier spacing. Since each RF subcarrier carries relatively little information content, for example, a 50 bit header, a subcarrier bit rate of about 155 Mb/s may be sufficient to achieving low latency in the switch as limited by the reading of the header content. All RF signals simultaneously modulate the optical carrier at the control wavelength $\lambda_C$. That is, an RF subcarrier $f_i$ on an optical carrier at $\lambda_C$ provides out-of-band header signaling information for WDM data carried on the optical $\lambda_i$ carrier, there being a one-to-one correspondence between RF $f_i$ and optical $\lambda_1$. As a result, the header 20 of FIG. 2 is separated from the data payload 22, removed from the WDM in-band carriers $\lambda_1 - \lambda_W$, and moved to the out-of-channel wavelength $\lambda_C$. That is, the header and payload are frequency multiplexed, not time multiplexed as implied in FIG. 2.

The optical router 58 switches the payload portion of the frame through the wavelength router 48 and probably converts its wavelength. However, it performs these operations at the optical level. Although it converts the header to electrical form, it does not convert the payload to electrical form, at least for retransmission. The receivers 62 may detect though probably not interpret the payload, and the controller does not process the payloads in determining the switching path and writing the new header. Hence, the payload is not restricted as to protocol within the frame-length limitations of the network, and the protocols may be digital, analog, or a combination of different digital, analog, or digital/analog protocols. Further, the protocols may vary between WDM channels and even between packets in a single WDM channel. The network can be described as being semi-transparent in that the optical payloads propagate without being absorbed, though with probable change in wavelength, but the headers are absorbed and regenerated at each node.

I and others have described a variant of this architecture in "Optical-label switching and routing by rapidly tunable wavelength conversion and uniform loss cyclic frequency array-waveguide grating," *Technical Digest*, Optical Fiber Communications 2001 Conference, Anaheim, Calif., Mar. 21, 2001, paper WDD49. In this variant, the RF subcarrier is directly impressed on the respective WDM wavelength channel.

The following paragraph will attempt to distinguish in-band, out-of-channel signaling from out-of-band signaling. Unusable wavelength regions separate the 850, 1310, and 1550 nm fiber bands. Within a fiber band, typically any wavelength is usable. In out-of-band signaling, the header is carried in one fiber band, for example, 1310 nm, while the data signals are carried at multiple ATM wavelengths in another fiber band, for example, 1550 nm. On the other hand, in-band, out-of-channel signaling is carried on a separate wavelength channel that is nonetheless at a wavelength included in the fiber band used by the data. For example, both data and signaling may be carried in the 1550 nm band but at different wavelengths within that band. An advantage of out-of-channel signaling is that the data payloads may be in any format and at any data rate. Indeed, analog data payloads, analog/digital combinations or arbitrary payload formats are switchable according to the described digital signaling circuitry since the data payloads are never detected and remodulated. An advantage of out-of-band signaling is the ease of separating the signaling information from the data payload. An advantage of in-band, out-of-channel signaling is the reduced complexity of the optics and nearly equivalent transmission over the fiber network spans.

Figure 5:
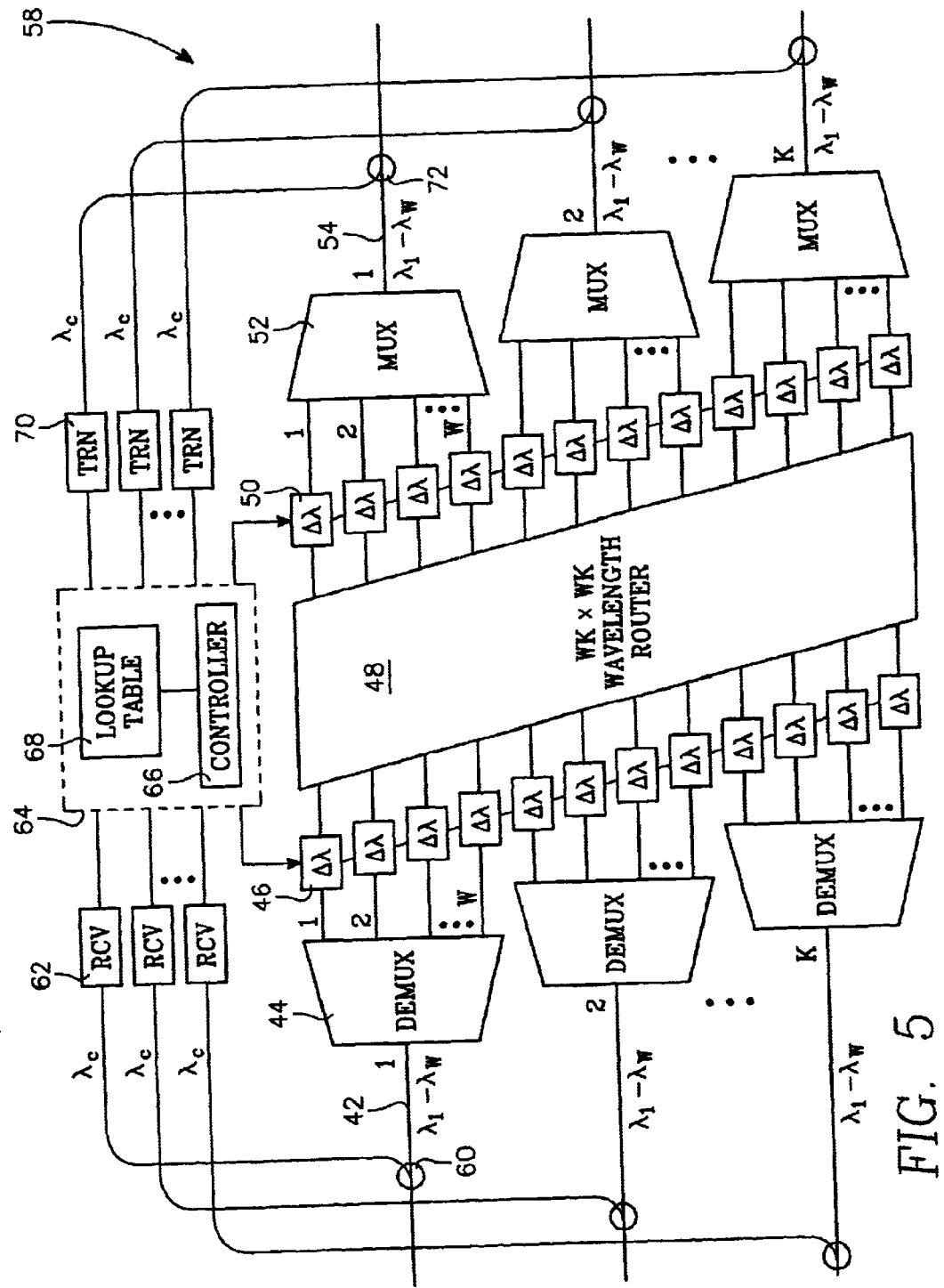
FIG. 5 is a functional diagram related to FIG. 4 but which additionally contains some switching control elements.

As shown in FIG. 5, The signal input of each of the input fibers 42 is split by a wavelength-selective splitter 60, which splits off the control channel at $\lambda_C$ to a header receiver 62 which detects an optical signal to allow a header receiver 62 to read the header and convert it to electronic form. For out-of-channel signaling, preferably only the optical component associated with the header is directed to the header receiver 62. With proper optical or RF separation, the header signals may be transmitted at lower data rates than the optical signals. Since only the header signal needs optical/electronic/optical (O/E/O) conversion, this division may reduce the required electronic data rates at the router. However, for a large number W of WDM channels, the combined signaling rate for all channels may exceed the data rate on a single WDM channel. Accordingly, M out-of-band channels, where M is two or more, and associated optical wavelengths $\lambda_{C,1}, \lambda_{C,2}, \ldots \lambda_{C,M}$ may be used for the signaling. Taking this into account, the following designs may need additional components to demultiplex the parallel signaling channels, process the signaling information mostly in parallel, and impress new headers on multiple signaling channels.

A switch control section 64 including a controller 66 and a lookup table 68 receives the requisite parts of the frame headers and determines the routing direction from the headers in comparison to the lookup table 68. Specifically which output fiber 54 and possibly WDM wavelength correspond to the destination address (or intermediate routing path) specified in the frame header. The switch controller 66 accordingly controls the wavelength conversion of the input wavelength converters 46. The switch controller 66 may additionally control the output wavelength converters 50. However, the output multiplexers 52 are typically though not necessarily designed such that each input receives an optical signal at a predetermined wavelength. As a result, the output wavelength converters 50 may receive an optical input signal of variable wavelength but produce an optical output of a fixed wavelength.

Additionally, depending upon the system design, the control section 64 may rewrite the header on the outgoing frame by inserting new headers on the output frames though these headers are inserted out of channel. Optical header transmitters 70 associated with each output fiber 54 perform the subcarrier multiplexing for all the WDM channels on that fiber and transmit the new header at the out-of-band wavelength $\lambda_C$. A new header is required because, at a minimum, the different subcarrier components at frequencies $f_1-f_W$ are likely to have originated from different input headers. Furthermore, because of wavelength conversion occurring during the switching, the correlation between the header information on $f_k$ and the data payload on $\lambda_k$ may need to be reestablished in the outgoing header. The switching of signaling information resembles the optical regeneration required of prior art electronic routers attached to multi-wavelength inputs, but the more significant payload need not be regenerated. Optical combiners 72 on the output fibers 54 combine the in-band WDM data signals at $\lambda_1-\lambda_W$ and the out-of-band or at least out-of-channel signaling information at $\lambda_C$.

As illustrated in FIG. 5, the wavelength router 48 need not itself be actively controlled. Instead, as described below for the preferred embodiment, a passive arrayed waveguide grating may be used to passively switches optical signals according to their wavelengths set by the input wavelength converters 46. The output converters 50 readjust the wavelengths for the desired WDM output channel.

Figure 6:
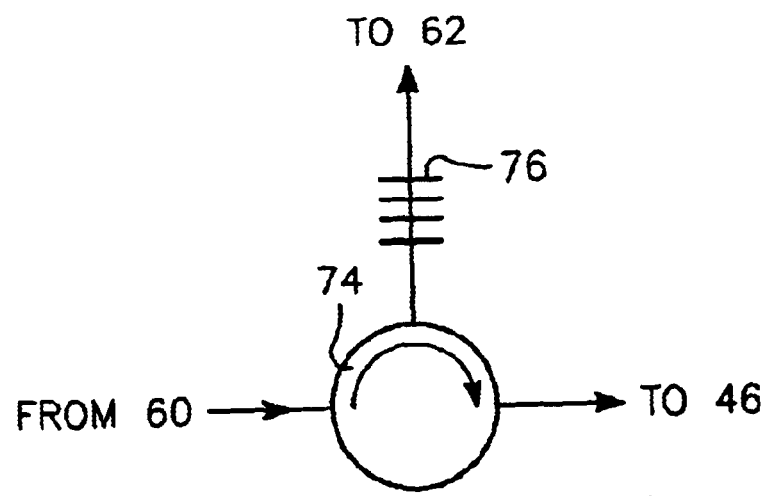
FIG. 6 is a schematic diagram of an optical splitter for closely spaced wavelengths.

For extended networks, it is desirable that the signaling control channel at $\lambda_C$ be in the same fiber transmission band as the WDM signals, that is, in-band signaling, so that both the control and WDM channels are equally well distributed around the network. Extended networks benefit from the 1550 nm band which provides the least absorption and is easily amplified by erbium-doped fiber amplifiers. Since the control and WDM channels are therefore closely spaced, the optical input splitter 60 may be implemented, as schematically illustrated in FIG. 6, as an optical circulator 74 receiving the input signal from the input fiber 42 and transferring it to an optical path towards the header receiver 62 but including an intermediate Bragg bandpass filter 76 tuned to the control wavelength $\lambda_C$. Only the header is transmitted through the Bragg filter 76, and the data wavelengths $\lambda_1-\lambda_W$ are reflected back through the circulator 74 to the associated optical demultiplexer 46.

Figure 7:
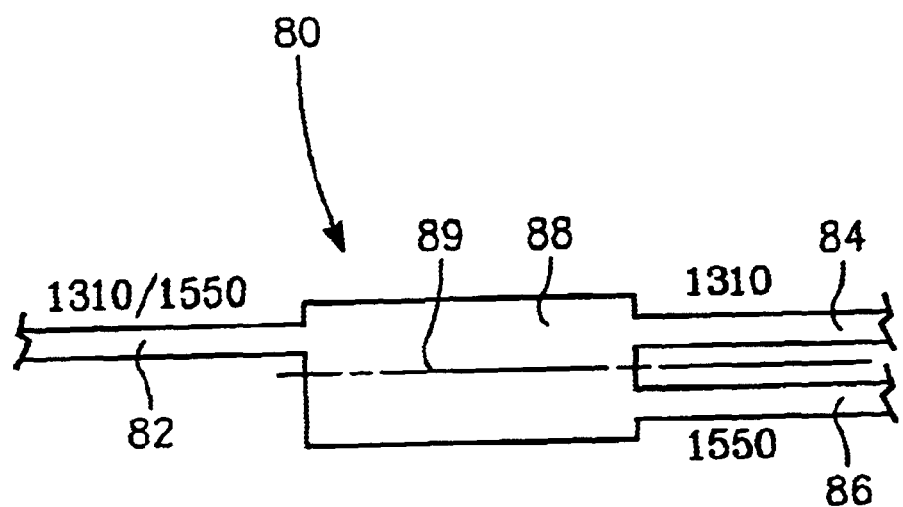
FIG. 7 is a schematic diagram of an optical splitter for widely separated wavelengths.

However, there are some applications for the high speed router of the invention in which the 1310 and 1550 nm bands can both be used. One such application involves transmission lengths of 1 km or less not requiring amplifiers and not much affected by frequency dispersion between the two bands. The wavelength-selective splitter 60 can be much more easily implemented for widely separated, out-of-band signals by a multi-mode interference (MMI) filter 80 schematically illustrated in plan view in FIG. 7. Three planar waveguides 82, 84, 86 are single moded at both 1310 and 1550 nm. One waveguide 82 is connected to one side of a multi-mode waveguide section 88 at positions offset from a central axis 89 of the multi-mode waveguide section 88, and the other two waveguides 84, 86 are connected on opposite sides of the central axis on the other side. The multi-mode waveguide section 88 is multi-moded at both 1310 and 1550 nm, and the two different wavelengths have significantly different eigenmodes within it. The length of the multi-mode section 88 is selected so that a single-mode signal at 1310 nm on the single waveguide 82 is concentrated at the 1310 waveguide 84 on the other side while the single-mode signal at 1550 nm is concentrated at the 1550 waveguide 86. This design works as a wavelength demultiplexer for signals propagating toward the right and as a wavelength multiplexer for signals propagating toward the left. It is understood that the design is not limited to the two stated wavelengths. In the immediate application, at least the 1550 nm signal is a multi-wavelength signal that will be demultiplexed by an AWG. However, the MMI filter 80 works best when the two wavelengths are widely separated in the different transmission bands of the silica fiber.

Figure 8:
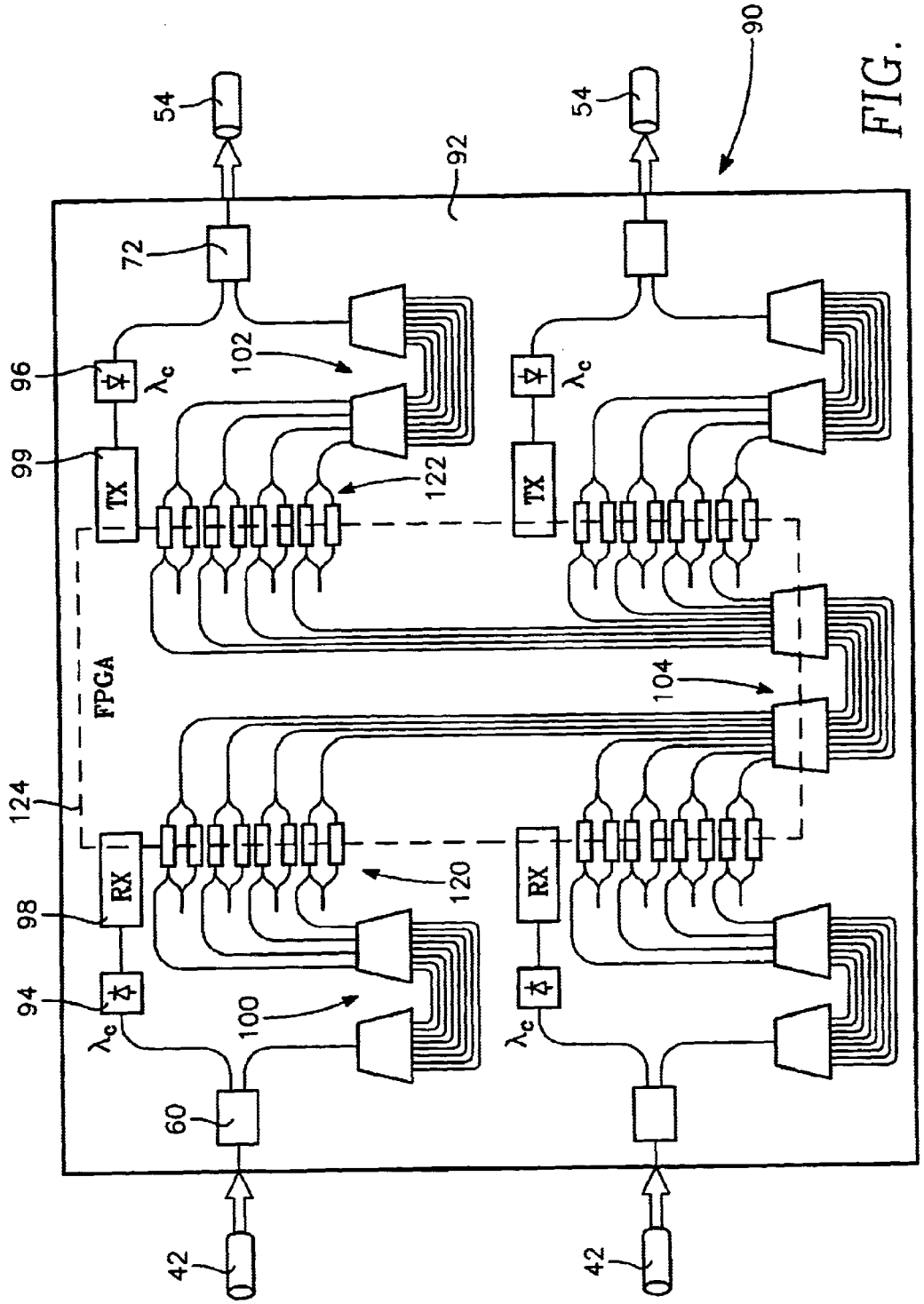
FIG. 8 is a layout of an embodiment of an integrated optical router of the invention.

A preferred layout for an optical router 90 integrated on a substrate 92 is illustrated in the schematic plan view of FIG. 8. In the illustrated router 90, there are two input fibers 42 and two output fiber 54 and four WDM wavelengths, that is, K=2 and W=4. However, it is appreciated that the system can be easily and scalably generalized to more complex systems characterized by larger values for either K or W. The initial design contemplates four input fibers, four output fibers and four WDM wavelengths, but larger sizes are planned. The router 90 is largely integrated on a substrate 92. Typical dimensions for a system with four input fibers 42 and four output fibers 54 are 1 m high and 4 cm wide. The fibers 42, 54 are mechanically fixed to the substrate 92 so to align them with the optical waveguides fabricated on the substrate 92.

The optics and the opto-electronics can be fabricated on a single substrate 92 using InP technology to be described later. The optoelectronics include optical detectors 94 detecting the out-of-band signaling at $\lambda_C$ and semiconductor diode lasers 96 emitting at $\lambda_C$ to form the new header. Receiver electronics 98 receive the detector outputs and extract the multiple RF subcarrier signals. Transmitter electronics 99 perform the inverse functions in controlling the lasers 96. Each laser may continuously output an optical carrier at $\lambda_C$ to an electro-optic modulator, to which the controlling RF subcarriers are simultaneously applied, or alternatively the lasers 96 may be directly modulated by the RF subcarriers. The preferably passive optics include all the illustrated waveguides as well as the optical splitters 60 dividing the out-of-band header signal to the detectors 94 and the optical combiners 72 combining the new out-of-band header signal with the switched and multiplexed WDM outputs.

The optics also includes three types of arrayed waveguide gratings (AWGs). A first or input AWG 100 is associated with each of the input fibers 42 and acts as the demultiplexer 44 of FIGS. 4 or 5 to demultiplex the WDM signal into its wavelength components. A second or output AWG 102 is associated with each of the output fibers 54 and acts as the multiplexer 52 to multiplex the different WDM channels at respective wavelengths $\lambda_1-\lambda_W$ onto a single multi-wavelength WDM signal. A third or switching AWG 104 serves as the wavelength router 48 to switch optical signals from any input port to any output port depending upon the wavelength of the optical signal. Planar waveguides formed in the substrate 92 and typically single mode interconnect the AWG 102, 104, 106 and the ports of the router as well as intermediate optical elements.

Figure 9:
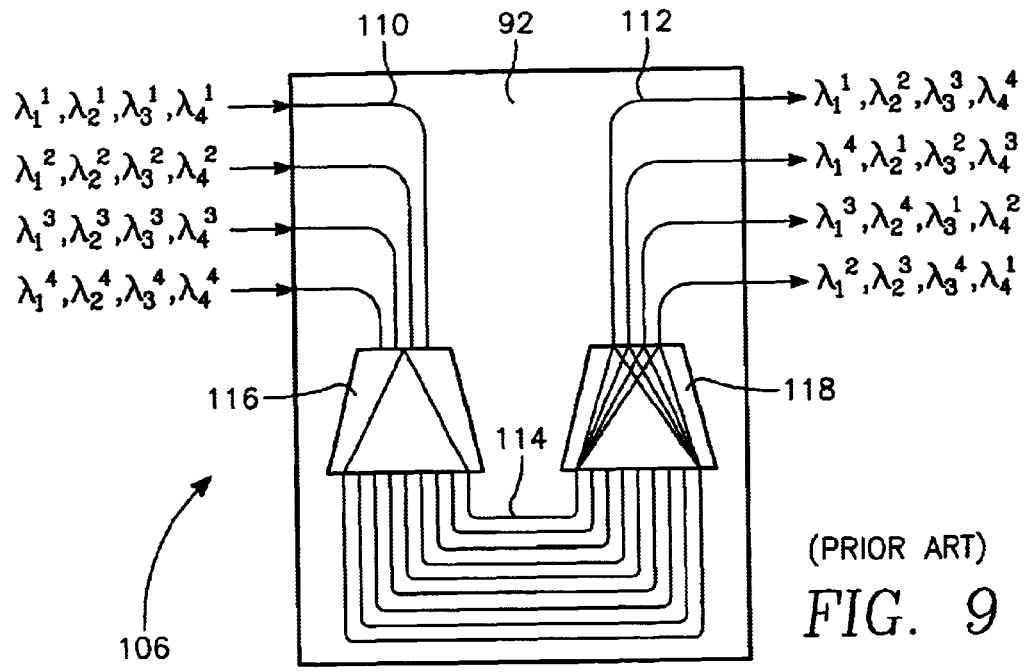
FIG. 9 is a plan view of a conventional arrayed waveguide grating.

Arrayed waveguide gratings are well known. A multi-input, multi-output arrayed waveguide grating 106 is illustrated in the schematic diagram of FIG. 9. It is formed in the substrate 92 and includes input waveguides 110, output waveguides 112, and grating waveguides 114. All the waveguides 110, 112, 114 are typically single-mode planar waveguides formed in the substrate 92. The input and grating waveguides 110, 114 are coupled through a first free-space region 116, and the grating and output waveguides 114, 112 are coupled through a second free-space region 118. The free-space regions 116, 118, also called slabs or star couplers, confine light vertically but not horizontally. The first free-space region 116 equally divides a signal on any input waveguide 110 to all of the grating waveguides 114. The lengths of the grating waveguides 114 are chosen to differ by predetermined amounts so as to induce differential phase delays between the same optical signal traversing different ones of the grating waveguides 114. The second free-space region 118 also equally divides a signal from any grating waveguide 118 to all the output waveguides. However, because of the differential phases induced in the different grating waveguides 114, optical signals from the outputs of the output free space region 118 at a given wavelength constructively interfere at the input to one of the output waveguides 112 and destructively interfere at inputs to the other output waveguides 112. As a result, the optical signals delivered to the output waveguides 112 are separated according to wavelength.

The AWG 106 thus acts to wavelength route optical signals. The figure shows the transmission of different signal $\lambda_i^j$ through the AWG 106, where the optical signal $\lambda_i^j$ represents the (i, j)-th data signal carried on the i-th optical wavelength $\lambda_i$. If only one input waveguide 110 is used, the AWG 106 acts as a demultiplexer. If one output waveguide 112 is used and each input waveguide 110 is impressed with a signal of a different but proper wavelength, the AWG 106 acts as a multiplexer for one of the output waveguides 112. The AWG 106 can also be used as a wavelength router by impressing the (i, j)-th data signal on a wavelength that assures it will propagate from the originating input waveguide 110 to the desired output waveguide 112.

Returning to FIG. 8, the AWGs differ in that the input and output AWGs 100, 102 have a number of ports on one side limited to the number W of WDM wavelengths and only a single port on the other side. However, the switching AWG 104 has a number of ports on each side that is the product of the number W of WDM wavelengths and the number K of fibers, that is, WK, and the number of required switching wavelengths $\lambda^s_1-\lambda^s_{WK}$ is also WK. Accordingly, the switching AWG 104 presents much a more of a design challenge. This design can be eased by the utilizing the nearly free selection of switching wavelengths. Although the channel separations on WDM systems is usually described in terms of a wavelength difference, in fact the ITU standard for the WDM comb is based on a fixed frequency spacing $\Delta f_0$ rather than a fixed wavelength spacing $\Delta \lambda_0$ between the WDM wavelengths $\lambda_1-\lambda_W$. Wavelength $\lambda$ and frequency f in a dielectric or semiconductor waveguide are related by $$f = \frac{c}{n(\lambda)\lambda},$$

where c is the speed of light, and n is the effective refractive index of the waveguide at the wavelength $\lambda$. Constant wavelength spacing over a band does not mathematically equate to constant frequency spacing. Furthermore, any dispersion arising from the wavelength dependence of the refractive index produces further difference. It is known that designing AWGs with constant frequency spacing is more difficult than with constant frequency spacing. However, the input and output AWGs 100, 102 are constrained by the WDM frequency comb and thus must be so designed. However, the frequencies being switched in the switching AWG 104 are determined by the tunable wavelength converters 120, 122. Advantageously, these switching frequencies are selected from a comb of WK switching wavelengths $\lambda^s_1-\lambda^s_{WK}$ having a constant wavelength spacing $\Delta \lambda_0$, thus easing the design and improving the performance of the large switching AWG 104. The difference between constant wavelength and constant frequency spacing only becomes an issue for three or more wavelength, and four wavelengths is usually considered a minimum design in any case.

The wavelength of a signal input on one input waveguide to the switching AWG 104 is chosen such that the signal propagates through the switching AWG 104 to a chosen switching output waveguide. A tunable wavelength converter 120 is interposed between each waveguide output of the input AWG 100 and the corresponding waveguide input to the switching AWG 104. The tuning of the input wavelength converters 120 determines the routing through the switching AWG 104 and hence through the optical router 90. Similarly, output wavelength converters 122 convert the signal from the switching wavelength to the WDM wavelength of the output. Typically, the input wavelength converters 120 also control the WDM wavelength of the output signal through the selection of the switching wavelength. On the other hand, the output wavelength converters 122 typically produce outputs at fixed wavelengths since each multiplexer input port has a fixed wavelength. As a result, each output port of the switching AWG 104 is associated with a particular WDM wavelength even though the switching wavelength used to reach it may be different. However, in some other systems, the output wavelength converters 122 may also be used to select the WDM wavelength. The preferred structure for the wavelength converters based upon tunable lasers and Mach-Zehnder interferometers will be described later. For this structure with fixed wavelength assignments in the multiplexers, the output wavelength converters may contain untuned lasers, but tunability has additional advantages to be described later The above description completes most of the description of the structure of the optical and opto-electronic part of the optical router 90 of FIG. 8. However, the tunable converters 120, 122 need to have their output wavelengths controlled according to information received in the out-of-band header signal. The optical detector 94 converts the header signal to an electronic form. The header receiver 62 (FIG. 5), includes the optical detector 94 and receiver electronics 98 of FIG. 8. It receives the electronic signal, separates out the W subcarriers $f_1$–$f_W$ and extracts the relevant portions of the header needed for switching. It is possible to fabricate the required high-speed electronics in the same InP substrate 92. However, it is instead preferred to form each receiver electronics 98 in a separate GaAs-based monolithic microwave integrated circuit (MMIC) and bond the multiple MMIC receiver electronics 98 to the substrate 92 after fabrication of the optical structures. The MMIC receiver electronics 98 provides the preamplification, postamplification, and buffering for the InP optical detector, measures the detected envelope, filters the signal, and demodulates the multi-frequency RF signals and delivers digital signals to the FPGA 124, to be described later which is the preferred implementation of the switch control section 64.

Figure 10:
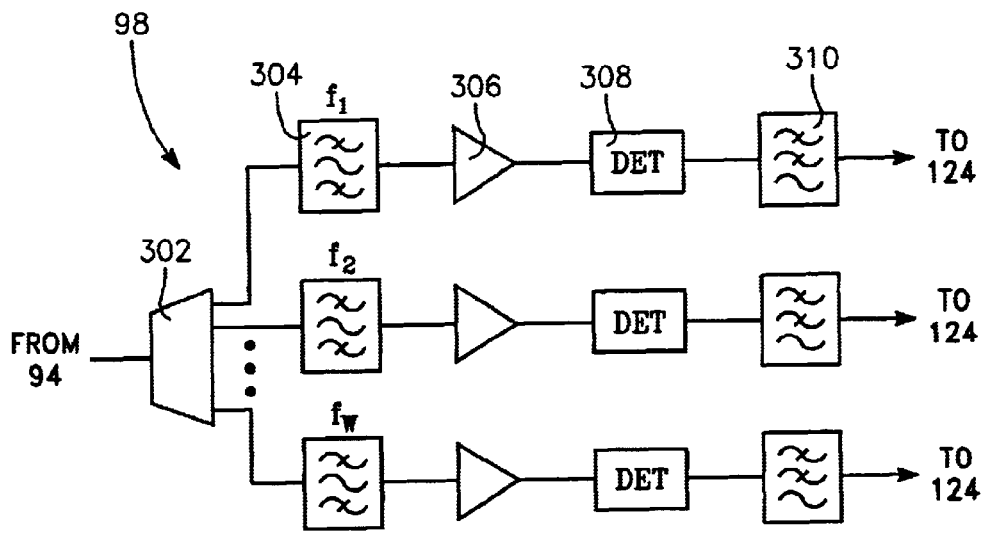
FIG. 10 is a circuit diagram of a multiplexed RF subcarrier receiver.

The circuit diagram of FIG. 10 shows a detailed implementation of the MMIC receiver electronics 98. A splitter 302 receives the photodetected signal from the 1310 nm photodetector 94 and splits it into W RF streams. A k-th stream identified with one of the WDM channels includes a narrow RF bandpass filter 304 tuned to the RF frequency $f_k$ of that stream. An amplifier 306 receives the filtered RF signal before an envelope detector 308 extracts the digital subcarrier signal at 155 Mb/s, which is filtered by a low-pass filter 310 before being passed to the k-th input of the FPGA 124.

Similarly, the transmitter electronics 99 needed to reconstitute the subcarrier signaling are conveniently formed of separate MMIC circuits formed in a GaAs substrate that are separately bonded to the InP substrate 92 of FIG. 8. The MMIC transmitter electronics 99 receives new signaling data from the FPGA 124, mixes the signal with the 14 GHz signal from one or local oscillators, filters the signal, and impresses the RF subcarriers on the 1310 nm transmitter 96.

Figure 11:
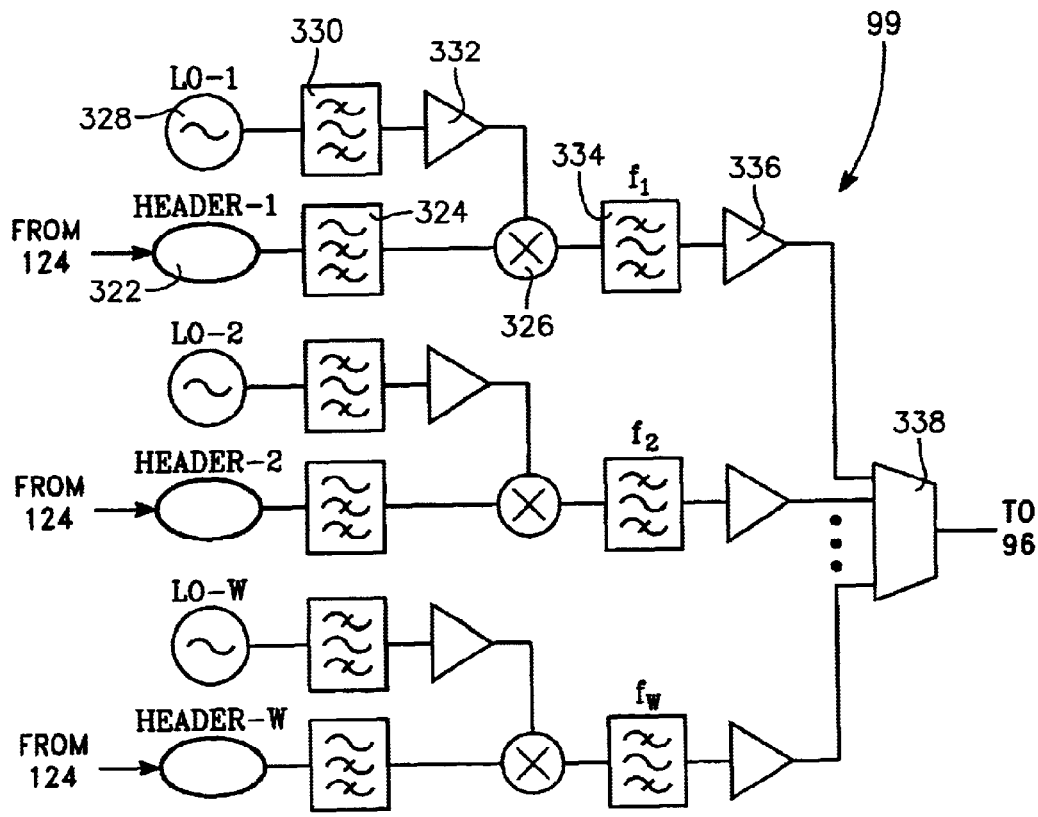
FIG. 11 is a circuit diagram of a multiplexed RF subcarrier transmitter.

The circuit diagram of FIG. 11 shows an implementation of the MMIC transmitter electronics 99 including W streams of outgoing header information. The k-th stream receives a 155 Mb/s digital header 322 from the k-th output of the FPGA. A high-pass filter 324 filters the digital header 322 before passing it to a mixer 326. A local oscillator 328 oscillates at a frequency of about 13 GHz, but its frequency is tuned to have offsets of 500 MHz between the local oscillators 328 of the different streams. A 13 GHz bandpass filter 330 filters the local oscillator signal, and an amplifier 332 amplifies it before passing it to the mixer 326. An RF bandpass filter 334 tuned to $f_k$ filters the mixed signal to produce the RF subcarrier. An amplifier 336 amplifies the RF subcarrier. An RF combiner 338 combines the RF subcarriers from all W streams, and the combined signal is used to modulate the 1310 nm laser diode 96.

In RF circuitry, specially designed splitters and combiners are commonly used to match impedance between the input and output. However, for the very short electrical connections envisioned in the RF electronics 98, 99 and associated opto-electronics, impedance matching is much less an issue so that the illustrated splitters 302 and combiners 338 may be formed in a tree-like electrical structure.

In order to allow solder bump contacts between chips, it is preferred that the receiver electronics 98 overlie the photodetector 94 or associated metallization, the transmitter electronics 99 overlie the output laser 96 or associated metallization, and that the FPGA overlie the receiver and transmitter electronics 98, 99, the active areas 140, 142, and the tunable lasers 132. The configuration illustrated in FIG. 8, on the other hand, is amenable to wire bonding.

The layout of FIG. 8 shows that the router 90 is divided into K input sectors and K output sectors separated by the switching arrayed waveguide grating 104. Each sector includes either the MMIC receiver 62 and detector 94 or transmitter 70 and laser 96, and the associated W tunable wavelength converters 120, 122. Each sector also includes a large input or output AWG 100, 102. The dimensions of the substrate 92 are quite large, particularly in the horizontal direction in which the optical waveguides need to slowly curve to minimize bending losses. It is estimated that a 1×4 input AWG occupies a footprint of 2.5 mm×1.5 mm and a 4×4 switching AWG a footprint of 6 mm×4 mm. If the receiver and transmitter electronics 98, 99 were fabricated as a single MMIC device, the large distances would present significant propagation problems for the high-speed signals needing to propagate between the MMIC and the detectors 94, the lasers 72, and the tunable wavelength converters 100, 102. However, the bonding in each of the sectors of separate MMIC receiver and transmitter electronics 98, 99 put these high-speed electronic devices relatively close to their associated opto-electronics, thereby reducing the length of electrical connections, reducing the need for transmission lines, and minimizing delays and capacitive broadening The control section 64 of FIG. 5 is preferably implemented as a separate circuit, such as a field programmable gate array (FPGA) 124 formed in a silicon substrate, which is bonded over or near the receivers 62, transmitters 70, and wavelength converters 120, 122. The flip chip bonding of the MMIC electronics and FPGA implies that the solder bumps used to bond are also being used to electrically contact underlying optical detectors, lasers, active areas, and tunable lasers. However, such registration is not portrayed in the drawings, both for ease of understanding and to account for the fact that in at least early implementation, bonding wires rather than flip chip solder bumps will provide the electrical contacts between the bonded chips and the underlying active areas of the substrate. With flip-chip solder bumps, the upper chips are turned over to place the active areas and associated solder bumps on the bottom in registry with the features in the substrate being contacted. With wire bonds, the active areas are typically left exposed on the top for wire bonding, although solder bumps may be used on the inactive bottom for physical inter-chip bonding.

Figure 12:
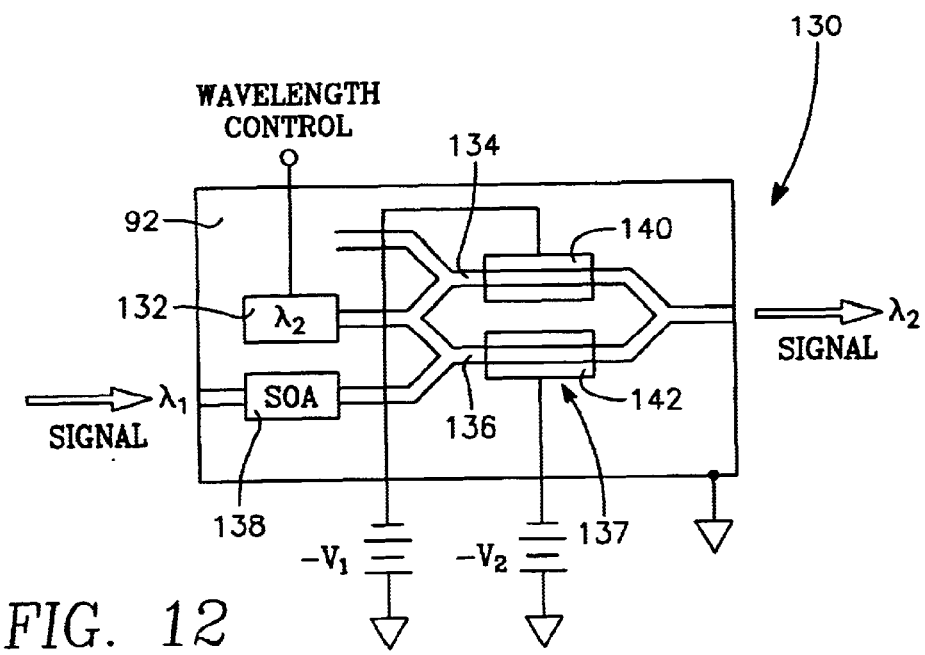
FIG. 12 is a circuit diagram of a wavelength converter usable with the invention.

The wavelength converters 120, 122 are preferably implemented in a common design as a wavelength converter 130, illustrated in the plan view of FIG. 12, preferably fabricated in the same InP substrate 92 as the rest of the optical router 58. I have disclosed this design in more detail in U.S. patent application Ser. No. 09/828,004, filed Apr. 6, 2001, incorporated herein by reference in its entirety. The wavelength converter 130 includes a planar optical waveguide receiving an input signal on an optical carrier at wavelength $\lambda_1$ modulated according to a data signal and another planar waveguide outputting an output signal of an optical carrier at wavelength $\lambda_2$ inherently modulated according to the same data signal. A tunable laser 132 sets the wavelength $\lambda_2$ under the direction of the router controller. I have disclosed the design for a four-section tunable diode layer in the above cited '384 patent application. That laser includes a gain section and a phase section sandwiched between sampled Bragg gratings. Respective electrodes separately tune the four sections. The tuned $\lambda_2$ laser output is split and applied to both arms 134, 136 of a Mach-Zehnder interferometer 137. The $\lambda_1$ input signal, after being amplified by a semiconductor optical amplifier 138, is applied to only one arm 136. Each arm 134, 136 includes active regions 140, 142, including a semiconductor junction. The active regions 140, 142 may operate as avalanche absorption regions, which are weakly absorbing at about 10% when they are negatively biased by two DC sources at $-V_1$ and $-V_2$. The electron avalanche effectively multiplies the number of electrons photo-generated by the absorbed light. The two biases may differ by a few percent in order to, among other reasons, introduce a controlled constant phase difference between the arms 134, 136. The modulated $\lambda_1$ data signal and the unmodulated $\lambda_2$ pump signal interact in the lower active region 142 to produce a modulated $\lambda_2$ component. There is no corresponding interaction in the upper active region 140. The $\lambda_2$ signals from the two interferometer arms 136, 138 when recombined interfere with each other to produce the data modulated optical output signal at $\lambda_2$.

The tunable laser 132 is electrically tuned and can produce radiation at any of the WDM wavelengths $\lambda_1$–$\lambda_W$, as required for the output wavelength converters, or at any of the switching wavelengths $\lambda^S_1$–$\lambda^S_{KW}$, as required for the input wavelength converters. Similarly, the wavelength converter 130 is preferably designed to receive and wavelength convert optical signals at wavelengths included in either of these two sets.

Somewhat similar wavelength converters substitute a semiconductor amplifier for the absorber in the active regions 140, 142. In fact, the difference is primarily a matter of forward rather than reverse biasing of a semiconductor junction structure. Operation in the reverse biased avalanche region permits wavelength conversion of optical signals with much higher bit rates compared to similarly located semiconductor amplifiers.

The semiconductor optical amplifier 138 on the signal input to the wavelength converter 130 can be advantageously used to monitor the state of optical signals. The amplifier 138 operates by forward biasing a semiconductor junction (typically of the same vertical structure as the active regions 140, 142). The illustrated optical router or some of its channels are sometimes put in idle mode. For example, there may be no traffic or there may be redundant routers which are electronically switched back and forth, that is, swapped. During the idle period in which no traffic requires the use of wavelength conversion, the biasing of the amplifier 138 may be changed to reverse biasing such that it can operate as an optical detector measuring the intensity of the optical carrier at the input to the wavelength converter. The current output of the reversed biased junction amplifier 138 measures the optical intensity it receives. In an input wavelength converter, the measured channel intensity is that at the input of the router. In an output wavelength converter, the measured intensity is affected by the tunable lasers of the input wavelength converters.

Figure 13:
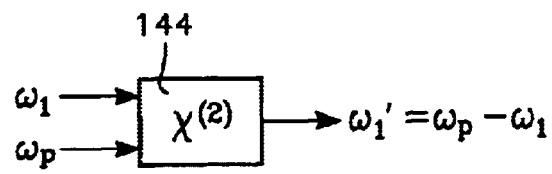
FIG. 13 is a schematic diagram of a wavelength conversion based on parametric difference frequency generation.

Other types of wavelength converters can be used. For example, a difference frequency generator 144 schematically illustrated in FIG. 13 relies upon a relatively large non-linear susceptibility $\chi^{(2)}$ found in GaAs and related AlGaAs to combine an input signal at $\omega_1$ with a pump signal at $\omega_p$ and parametrically convert them to an output signal at $$\omega_1'=\omega_p-\omega_1.$$

I and others have described an example of this type of wavelength converter in U.S. Pat. Nos. 5,696,902 and 5,801,232. Quasi-phase matching is used to match the differing propagation velocities of the pump and signal light over the relatively long non-linear interaction region.

At least two timing issues for the optical router need to be addressed in ways distinctly different from solutions available for electronic routers. The two issues arise from label reading and channel contention.

Figure 14:
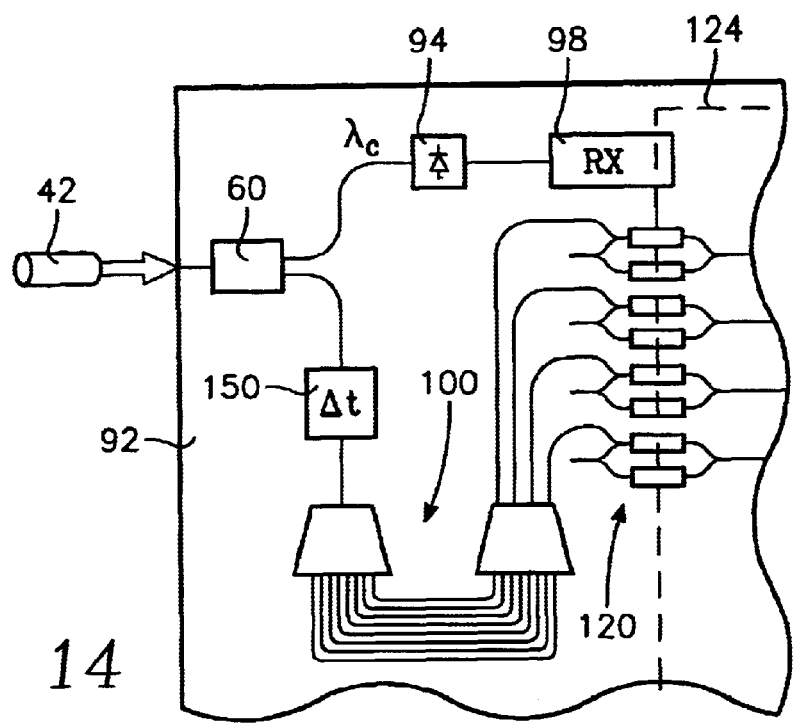
FIG. 14 is a circuit diagram of a receiver sector of an optical router including a delay element.

Label reading will be addressed first. The frame header determines the routing of the data payload of the same frame. Even with very fast electronics, label reading and processing requires about 10 to 50 ns, which corresponds to about 60 bytes for a 10 Gb/s signal. For time multiplexed headers and data payloads, this means that a sizable portion of the data payload has been received before the router has sufficient time to determine its routing path. For an out-of-channel subcarrier header, the problem can be even worse since the header and data payloads may be simultaneously received over a 500 byte period, that is, 400 ns payload reception time over which the header is also being received and 50 ns processing time for a total of 450 ns. One method of resolving the problem introduces a delay into the data payload but detects and processes an undelayed header. For example, as illustrated in the schematic diagram of FIG. 14, an optical delay element 150 is disposed in the planar waveguide between 1310/1550 splitter 60 and the input AWG 100. Although a 10 ns delay may be acceptable, the preferred 50 ns delay for a time multiplexed header can be obtained by about 10 m of optical fiber butt coupled on both ends to the planar waveguide although 250 ns of delay ensures an operating window. If the out-of-channel header is simultaneously received out of channel with the data payload, the delay needs to be even longer, for example, 450 ns to allow 400 ns for reception and 50 ns for processing. However, if the header is sent well in advance of the payload, a 50 ns delay can prevent processing delays from accumulating across the network.

Figure 15:
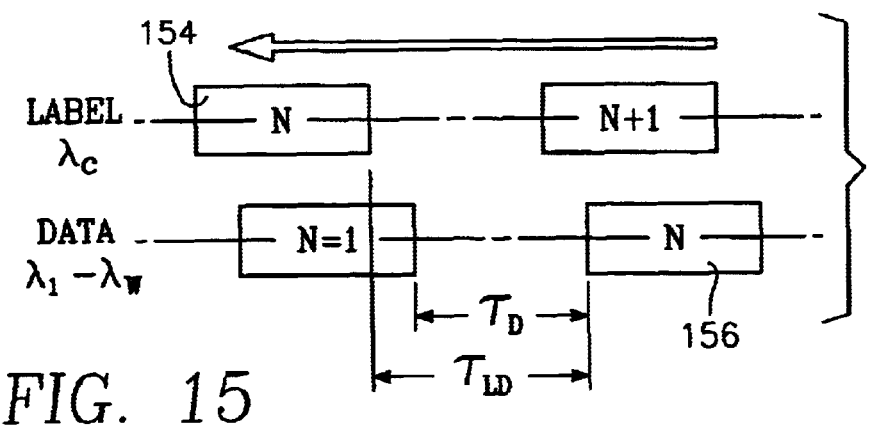
FIG. 15 is a timing diagram illustrating a useful time delay between the header and data payloads.

The problem of excessive times required to read labels can be addressed in the case of an out-of-channel header signal at the system level by differential transmission timing between the label and payload. In the timing diagram of FIG. 15, the signals propagate to the left and time increases to the right. The out-of-channel label (header) 154 at subcarrier $f_i$ impressed on optical carrier at $\lambda_C$ can be sent well in advance of the associated data payload 156 at optical carrier $\lambda_j$, both of which are labeled in the illustration as part of the N-th packet. The figure assumes that different RF subcarriers $f_j$ referring to different WDM carriers $\lambda_j$ are being simultaneously transmitted. The timing should include a fixed label-data delay $\tau_{LD}$ between the end of the label 154 and the beginning of the data payload 156. During the label-data delay $\tau_{LD}$, the label is being interpreted, the routing determined from the look up table, and finally the tunable laser for the channel being switched is retuned for the desired output path. As stated before, the processing delay is typically 10 to 50 ns after reception of the complete label. Frequency dispersion on the network may change the label-data delay $\tau_{LD}$ between the transmitting and receiving nodes. The label-data delay $\tau_{LD}$ needs to be closely controlled because the timing of the beginning of the data payload 156 is not otherwise determined in the optical router.

As illustrated, the labels 154 of one packet may overlap in time the data payloads 156 of another packet of different value of N, even for the same WDM wavelength $\lambda_i$. The data payloads 156 of different packets for the same carrier wavelength $\lambda_i$ should be separated by a minimum inter-data delay $\tau_{DD}$ that allows retuning of the lasers and accommodates system jitter including any uncertain network frequency dispersion. The four-section diode lasers of the type described above have been shown to switch in less than 1 ns, thus satisfying the requirements for a 10 Gb/s system with reasonably long frames. Subcarrier headers of different channels $\lambda_i$ may be impressed at their respective frequencies $f_i$ on the same signaling carrier $\lambda_C$ so that the labels for the different WDM channels $\lambda_i$ overlap on the $\lambda_C$ signaling channel. The advance reception of the out-of-channel header allows the elimination of the delay element 150 of FIG. 14. However, the advance reception of the header works only for networks having a limited number of hops through routers. Each router node decreases the label-data delay $\tau_{LD}$ by the amount of time required to detect and process the out-of-channel header because only thereafter can the outgoing header be sent. Meanwhile, the undelayed data payload continues to come closer to the header.

Figure 16:
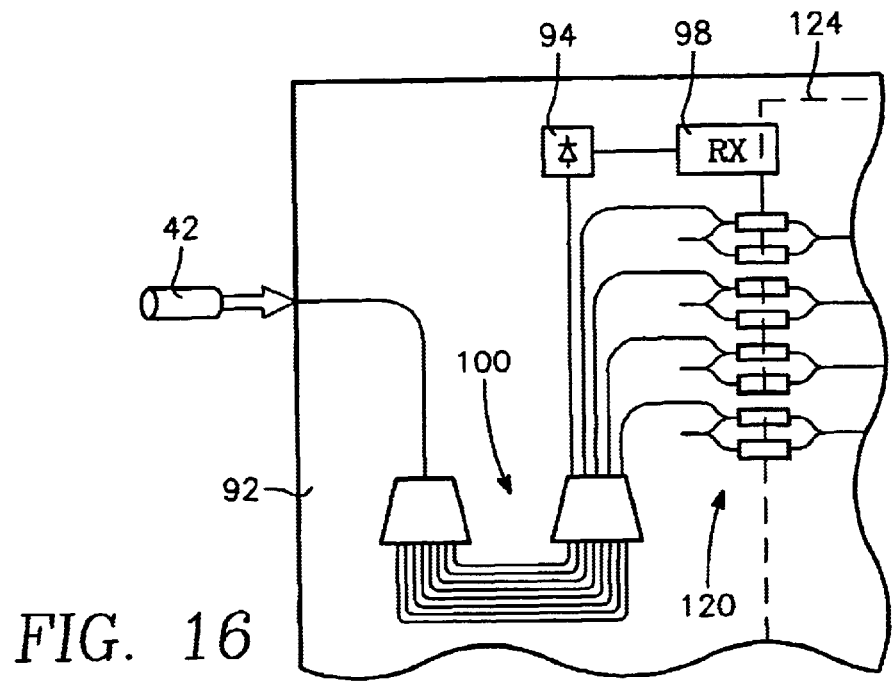
FIG. 16 is a circuit diagram of a receiver sector of an optical router employing delayed out-of-channel, in-band signaling.

The advance reception of the out-of-channel header further allows the elimination of the separate optical splitter 60. Instead, the header optical carrier $\lambda_C$ may be placed within the same fiber band as the WDM wavelengths $\lambda_1-\lambda_W$, for example, the 1550 nm band, but at a different wavelength than any of the WDM wavelengths $\lambda_1-\lambda_W$. The header carrier $\lambda_C$ is preferably spaced from the WDM wavelength by the same or a small multiple of the WDM channel spacing. The result is in-band, out-of-channel signaling, which increases the number of wavelengths in the WDM comb by one wavelength and uses that wavelength for advance signaling rather than for data. In the receiver sector illustrated in the circuit diagram of FIG. 16, the optical signal from the input fiber 42 is input without splitting to the input AWG 100, which is redesigned to accommodate the extra signaling wavelength. A planar waveguide conveys the AWG output for the added wavelength to the photodetector 94, and the receiver electronics 98 receives the electrical output to control the routing. Not only does this design simplify the router design, the in-band, out-of-channel control signal is carried in the same 1550 nm (or other wavelength) band as the data signals, thus requiring no special optical design on the router chip. Furthermore, there will be relative little network dispersion between the data and signaling, and optical amplifiers on the network or on the router chip, as required, can commonly amplify the control signal together with the data signals. This is especially important for a rare-earth (erbium) doped fiber amplifier (EDFA), which has a relatively narrow amplification band.

Figure 17:
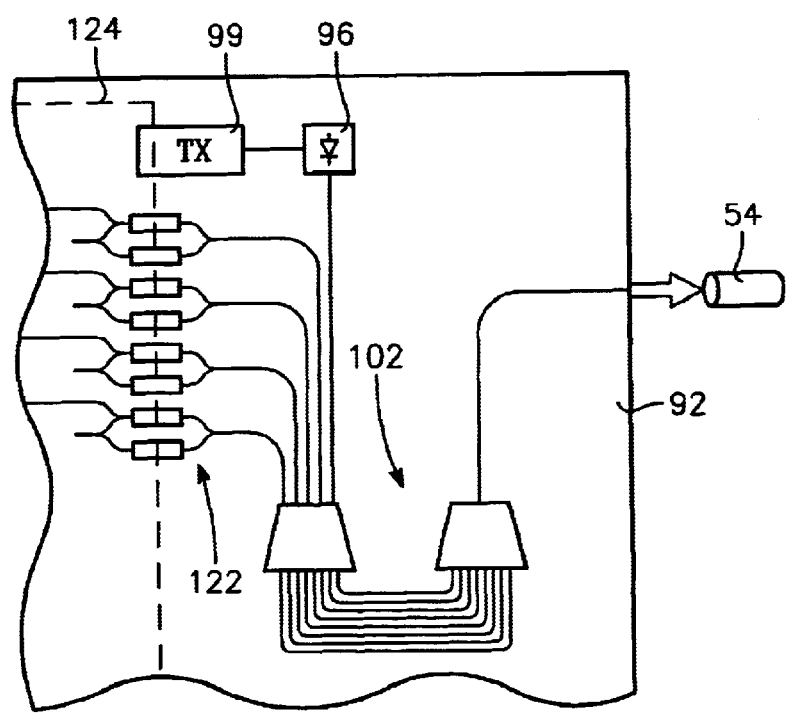
FIG. 17 is a circuit diagram of a transmitter sector corresponding to the receiver sector of FIG. 16.

Similarly, in the corresponding transmitter sector, illustrated in the circuit diagram of FIG. 17, the wavelength of the transmitter laser 96 is chosen to fall in or close to the WDM fiber band but at a different channel from the data within that band. The optical output of the laser 96 is connected to the input of an expanded output AWG 102, which recombines the data and header signaling wavelengths onto the output fiber 54.

For in-band signaling, the photodetector 94 and the transmitter laser 96 may be designed similarly to the tunable lasers 132 of the wavelength converters 120, 122 of FIG. 12. The common design not only eases the fabrication, it also allows all optical output channels of the router to be wavelength tunable. Universal tunability can be used either for fine tuning to compensate for component drift or for coarse tuning to change to a different signaling wavelength, as might be required for links having different WDM wavelength combs.

The second timing issue involves channel contention. A router is subject to nearly random incoming traffic and required routing. In particular, two or more simultaneously coincident packets may need routing to the same output. An electronic router resolves the contention problem by storing incoming packets in a buffer memory from which the packets are read when the desired output channel becomes available. Finite buffers do not completely resolve the contention problem in very heavy traffic or congested networks since the buffer may overflow. TCP/IP networks are designed for loss of some packets during transmission, in which case the originating transmitter is informed of the loss and the data is retransmitted. As a result, such networks do not need contention to be eliminated, only managed to a reasonable level.

The optical router of FIG. 8 can manage a reasonable level of contention as long as the transmission capacity of the output fibers 54 is reasonably high and the network is designed to allow arbitrary assignment to a switched packet of transmission wavelengths within the WDM comb. The input AWG 100 and input wavelength converters 120 are themselves non-blocking. The switching AWG 104 has a sufficient number of paths and switching wavelengths for all arriving signals to be non-blocking. Contention, however, may arise if it is required to switch two packets to the same wavelength on the same output fiber 54. But, if the output fiber wavelength assignment is made based on whatever of the W wavelengths are available on the output fiber 54, then contention arises only when all W wavelength channels are already busy. The probability that all W channels are busy is much less than the probability that a WDM channel of a particular wavelength is busy. Thus, the illustrated optical router 90 effectively can manage contention at some acceptable level without the need to buffer the optical data signals.

Nonetheless, optical buffering is advantageous. One approach considered in the '384 application uses the fiber delay introduced by about 10 m or more of optical fiber connecting one of the output fibers 54 to one of the input fibers 42 in a feedback loop rather than the two fibers 42, 54 being externally connected. The delayed feedback connection of one or more wavelength-separated channels between the input and output AWGs 100, 102 would also be effective. Whenever an incoming signal is blocked, it is sent through the delayed feedback loop.

Figure 18:
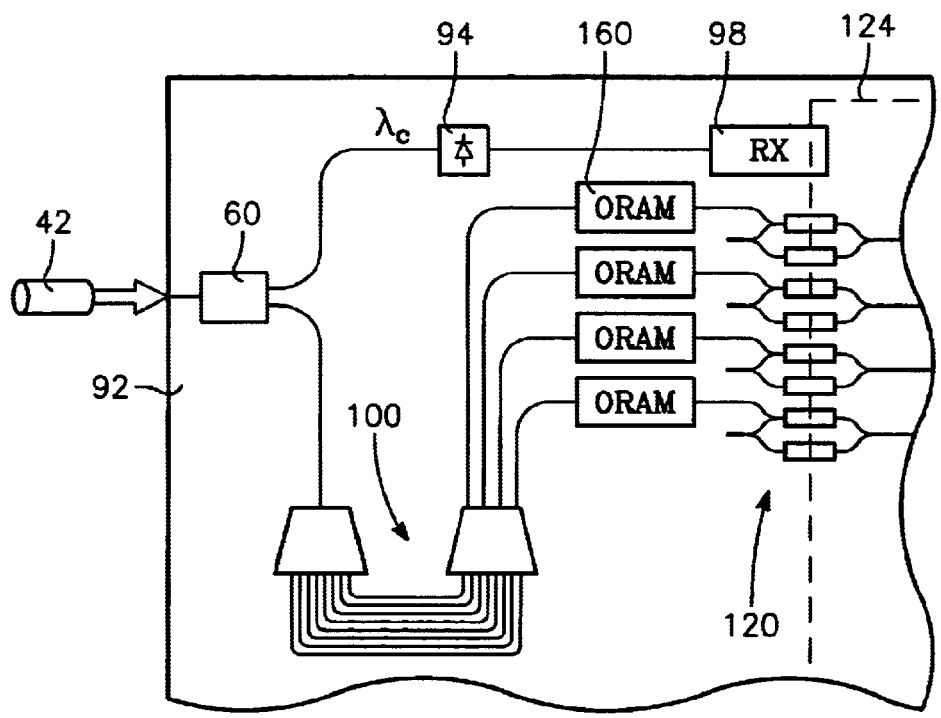
FIG. 18 is a circuit diagram of a receiver sector of an optical router employing optical memory with out-of-band signaling.

In a more preferred approach, as illustrated in the circuit diagram of FIG. 18, the receiver sector includes optical random access memories 160 interposed on the planar waveguides between the outputs of the input AWG 100 and the corresponding wavelength converters 120. Even with no delay either between the header and data or induced in the data on the chip, the header can be detected and processed by the receiver electronics 98 while the corresponding data is being stored in the optical memories 160. Only when the desired output channel for the packet becomes available is data read from the optical memory 160 storing it.

Figure 19:
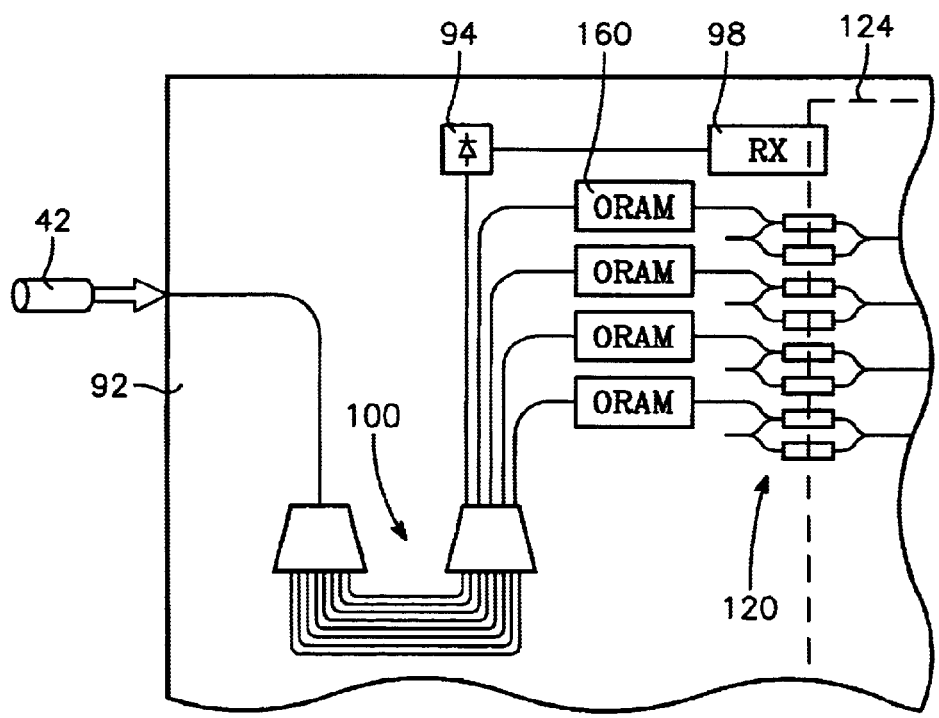
FIG. 19 is a circuit diagram of a receiver sector similar to that of FIG. 18 but employing in-band, out-of-channel signaling.

The optical router using optical memory illustrated in FIG. 18 is appropriate for out-of-band signaling, e.g. at 1310 nm. However, the optical memory can be equally well applied to an in-band, out-of-channel system illustrated in FIG. 19 in which the frame is wavelength selected by the input AWG 100 and the data payloads are directed to respective optical memories 150. It is also possible to use in-channel, time-multiplexed signaling in which the entire frame is stored in the optical memory, and the header portion is read while the data payload remains in the optical memory.

Figure 20:
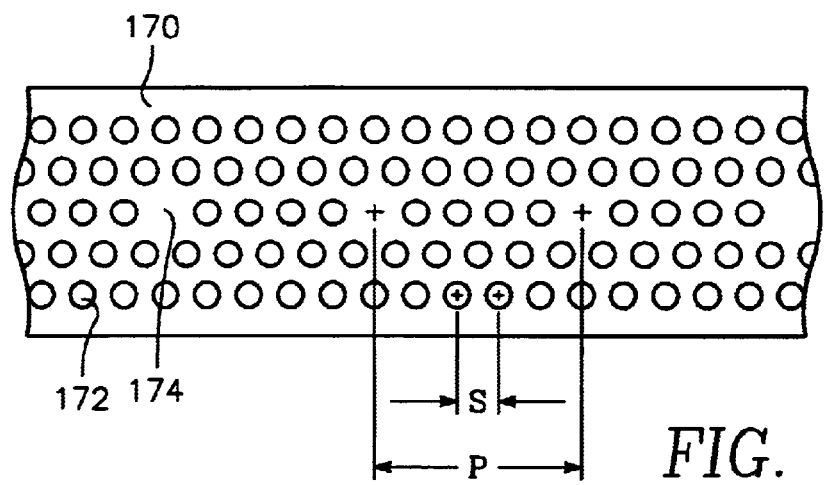
FIG. 20 is a plan view of a photonic trap formed in a waveguide.

One type of optical memory is a serial device providing a variable optical delay and based on electromagnetically induced transparency (EIT) and photonic band gap (PBG). A planar waveguide 170, shown in schematic plan view in FIG. 20 is formed in the substrate 92 with lateral confinement in one direction and a periodic structure, for example, of holes 172 formed in the other direction in the semiconductor waveguide material. The holes are arranged in a close packed hexagonal array to achieve a photonic band gap. The holes 172 are included in a class of features formed in the waveguide 170 having a different refractive index than the surrounding material. The hole spacing s, may be 515 nm for the 1550 nm light being considered, and their diameter may be 100 nm. It is known that such an arrangement produces a photonic band gap. Light having an energy within the band gap cannot propagate through the structure. However, the hole arrangement also includes one or more defects, for example an absence 174 of a hole. Preferably, a plurality of defects 174 are arranged with a regular spacing P, for example of 5 to 10 $\mu$m, along the axis of propagation of the light. Each defect 174 serves as a photon trap. The two holes 172 immediately adjacent the defect 174 and in line with the direction of propagation may be made larger to break the dipole degeneracy. The holes 172 around each defect 174 also form Bragg-like reflectors so as to create a resonant cavity about the defect 174 having a resonant wavelength $\lambda_{CAV}$. Light of forbidden energy can be trapped by such defects in what is called a photonic bandgap trap.

Figure 21:
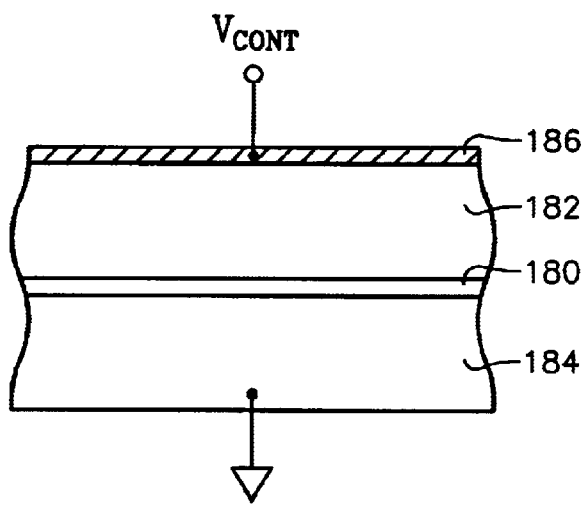
FIG. 21 is a cross-sectional view of the waveguide of FIG. 18.

The vertical structure within the waveguide 170 ignoring the holes 172 is schematically illustrated in FIG. 21. It includes an active layer 180 sandwiched between conductive upper and lower cladding layers 182, 184, for example, a 1 $\mu$m-thick p-type upper cladding layer 182 and a 1 $\mu$m-thick n-type lower cladding layer 184, both composed of InP. The InP substrate is not illustrated. A control electrode 186 overlies the waveguide 170 in opposition to the lower cladding being held at a predetermined electrical potential, for example, ground. The holes 174 should extend through at least the active layer 180 but are more easily formed through all three layers 180, 182, 184. The active layer 180 forms the planar core of the optical waveguide. Lateral waveguide sides are otherwise defined by the buried heterostructure waveguide. The active layer 180 may be composed of a plurality of quantum well barriers formed, as schematically illustrated in the cross-sectional view of FIG. 22, by forty doped quantum wells 186 separated by barriers 188. For 1550 nm light, the quantum wells 186 may be n-doped to $1 \times 10^{11}$ cm$^{-2}$, have a thickness of 10 nm, and be composed of $In_{0.47}Ga_{0.53}As$, and the barriers 188 may be undoped, have a thickness of 10 nm, and be composed of $Al_{0.48}In_{0.52}As$. The resulting active core layer 180 has a total thickness of 400 nm.

Figure 23:
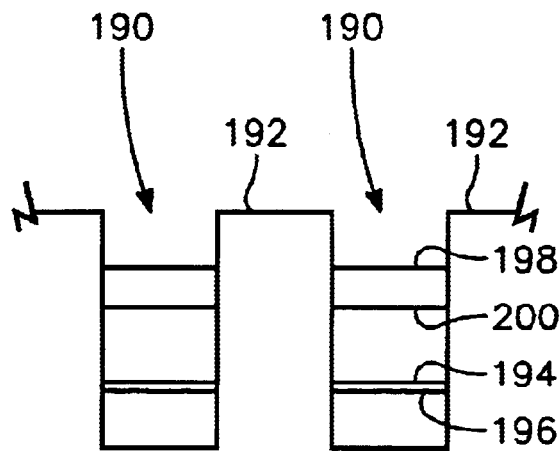
FIG. 23 is a schematic illustration of the energy levels in coupled quantum well.

As illustrated in the energy vs. distance diagram of FIG. 23, this structure produces electronic quantum wells 190 separated by barriers 192. Each quantum well 190 has at least two electron/hole energy levels, which are coupled across the barriers 192 and thereby split in energy. The lower level splits into narrowly spaced subbands 194, 196 while the upper level splits into more widely spaced subbands 198, 200 separated by an energy $\Delta E_{QW}$. A resonance at an optical wavelength $\lambda_{EIT}$ is formed by the beating of transitions from the closely spaced lower subbands 194, 196 to respective ones of the upper subbands 198, 200. Although long predicted, this effect has been verified by Phillips et al. in "Observation of electromagnetically induced transparent and measurements of subband dynamics in a semiconductor quantum well," *Physica E: Low-dimensional Systems and Nanostructures*, vol. 7, nos. 1, 2, April 2000, pp. 166 –173. The resonance not only makes the otherwise opaque material transparent, it substantially slows the speed of light propagation.

The photonic band gap of itself produces trapping times of only about 100 ps, which is insufficient for optical memory. However, the electromagnetically induced transparency has the effect of slowing down the light propagation by factors of up to $10^8$. If the effects are combined under the conditions that $$\lambda_{CAV} \approx \lambda_{EIT} \approx \lambda_i$$

then the WDM channel having the carrier wavelength $\lambda_i$ will be delayed for controllable times as long as 1 ms, which is sufficient for optical packet switching. The combination of photonic bandgap and quantum wells has been used to fabricate tiny optically pump lasers, as described by Painter et al. in "Two-dimensional photonic band-gap defect mode laser," *Science*, vol. 284, no. 5421, 1999, p. 1819.

The exact frequencies of the cavity and EIT resonances are electrically tuned by a DC signal applied to the upper electrode 186 of FIG. 21. In operation, when delay is needed for the $\lambda_i$ WDM channel, a control signal $V_{CONT}$ on the electrode 186 of the corresponding channel is changed to tune the resonances so that optical signal is slowed down and effectively trapped. The amount of delay can be determined beforehand to produce only partial resonance or alternatively complete resonance may be tuned for a selected length of time less than the maximum available delay. When delay is no longer needed, the control signal $V_{CONT}$ on the electrode 186 detunes the resonances to cause the light to quickly propagate along the waveguide.

Figure 22:
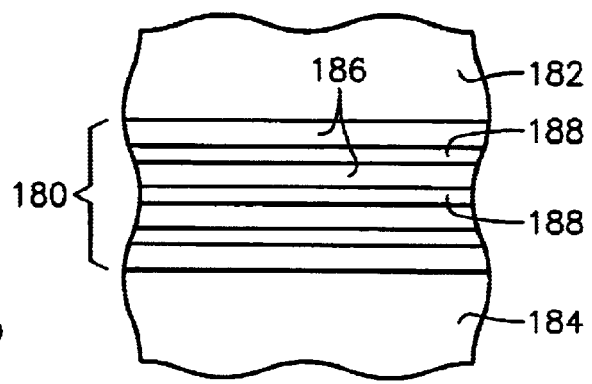
FIG. 22 is an exploded cross-sectional view of the active area of the waveguide of FIG. 21.

The optical memory described in FIGS. 20 through 22 is a controllable optical delay line and may be operated as a first-in/first-out buffer by the use of multiple separately controllable delay stages. More random access is possible by putting several such delay elements in parallel.

Figure 24:
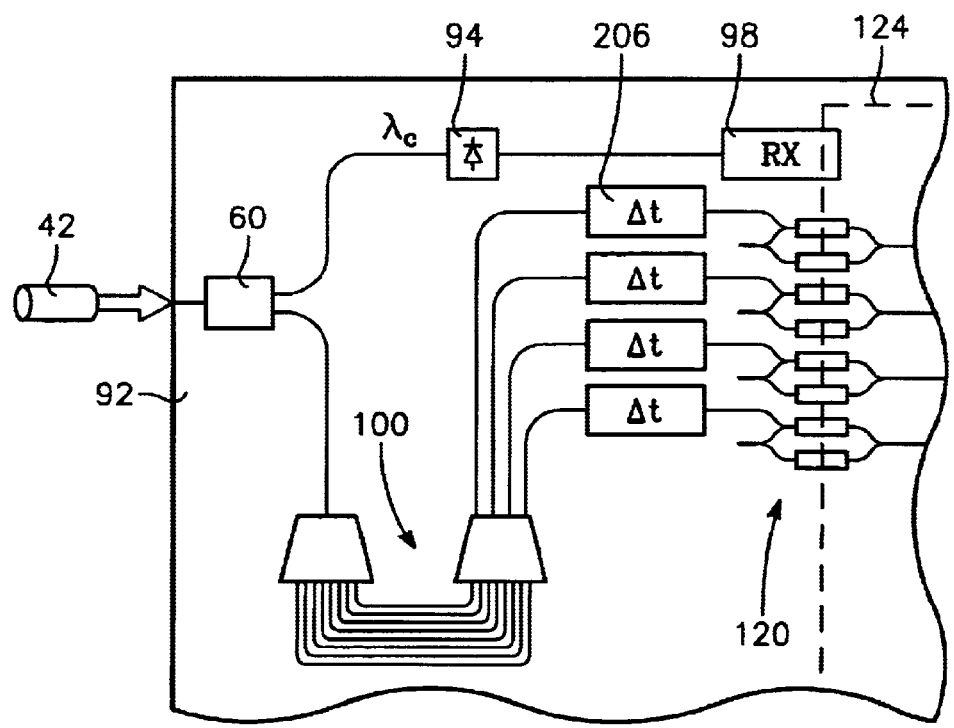
FIG. 24 is a circuit diagram for a receiver section of an optical router employing optical delay elements in the wavelength separated channels with out-of-band signaling.
Figure 25:
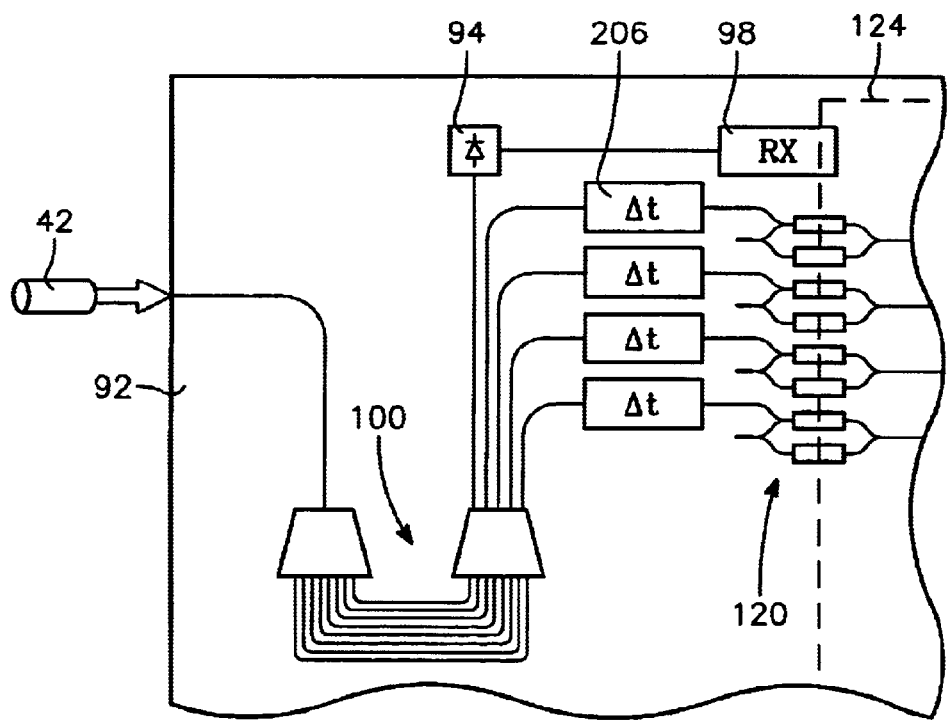
FIG. 25 is a circuit diagram of a receiver sector similar to that of FIG. 25 but employing in-band, out-of-channel signaling.

A structure similar to the controllable optical delay line can be used as a relatively fixed optical delay either for out-of-band signaling in FIG. 24 or for in-band, out-of-channel signaling in FIG. 25 for the respective the input sections. In either case, a fixed optical delay element 206 placed between the wavelength-separated outputs of the input AWG 100 and the corresponding wavelength converters 120. The optical delay elements can provide sufficient delay of at least 10 ns and preferably 50 ns or more in the respective data channels to allow the photodetector 92 and receiver electronics 98 to detect and process the undelayed signaling channel to thereby enable real-time control of the wavelength converters 120, 122. Since each optical delay element 206 delays only one of the WDM wavelengths $\lambda_k$, it need be resonant over a relatively narrow bandwidth, vastly simplifying its design. The control electrode 186 of FIG. 21 may be used for its tuning. The delay lines, particularly when formed in the same substrate as the rest of the router are much superior to loops of optical fiber, which is difficult to couple to planar waveguide.

Figure 26:
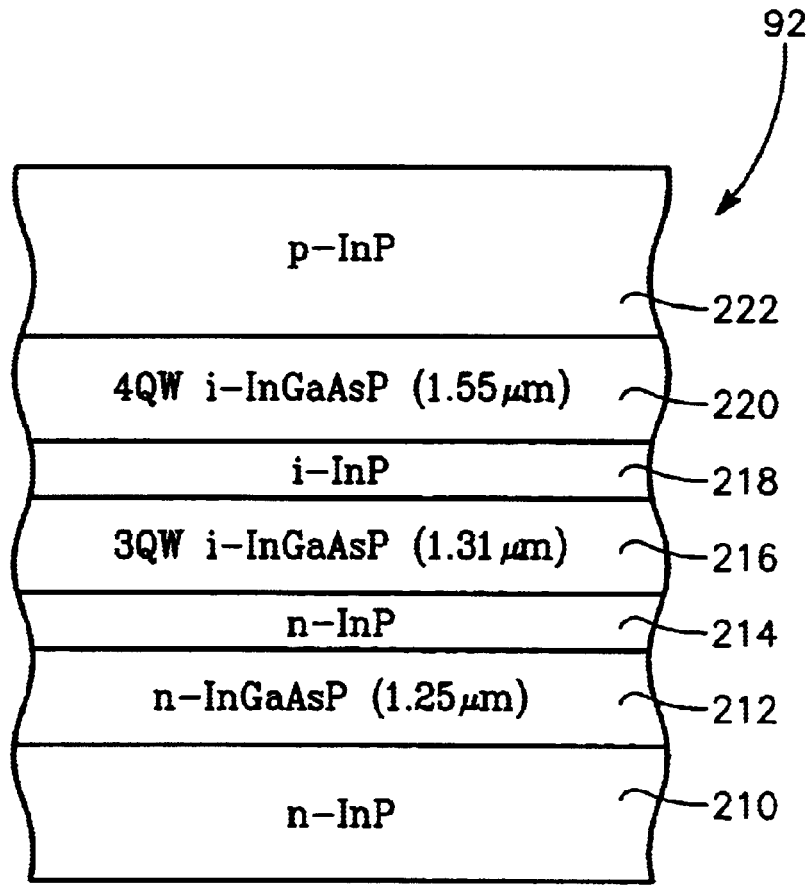
FIG. 26 is a cross-sectional view of a substrate in which an integrated optical router can be formed.

The integration on the same InP substrate of the passive waveguide with at least the 1550 nm lasers and active regions and possibly with 1310 nm detectors and lasers requires complex processing, which can be accomplished starting with the epitaxial InP-based stack illustrated in cross section in FIG. 26. Over an n-type InP substrate 210 or alternatively an n-type InP base layer, which serves as the bottom electrode, is grown a 500 nm-thick passive waveguide layer 212 formed of a quaternary InGaAsP composition having a bandgap of 1.25 μm. An n-type etch stop layer 214 of InP is then deposited. Etch stop layers may be 20 nm thick. Over the etch stop layer 21, an 1310 nm layer 216 is deposited including three unstrained quantum wells of quaternary InGaAsP wells and InGaAsP barriers of differing composition in which the wells have a compositional bandgap of 1.31 μm. The 1310 nm lasers and detectors will be formed in the 1310 nm layer 216. Another undoped etch stop layer 218 is deposited over which is deposited an undoped 1550 nm layer 220 including four 1% compressively strained quantum wells of InGaAs barriers and strained quaternary InGaAsP wells having a compositional bandgap of 1.55 μm. The avalanche region of the wavelength converters and the 1550 nm lasers, if any, are formed in the 1550 nm layer 220. A 40 nm-thick p-type InP cap layer 22 completes the semiconductor junction. The n-type base layer 210 and the p-type cap layer 222 serve as cladding layers for the intermediate layers.

Figure 27:
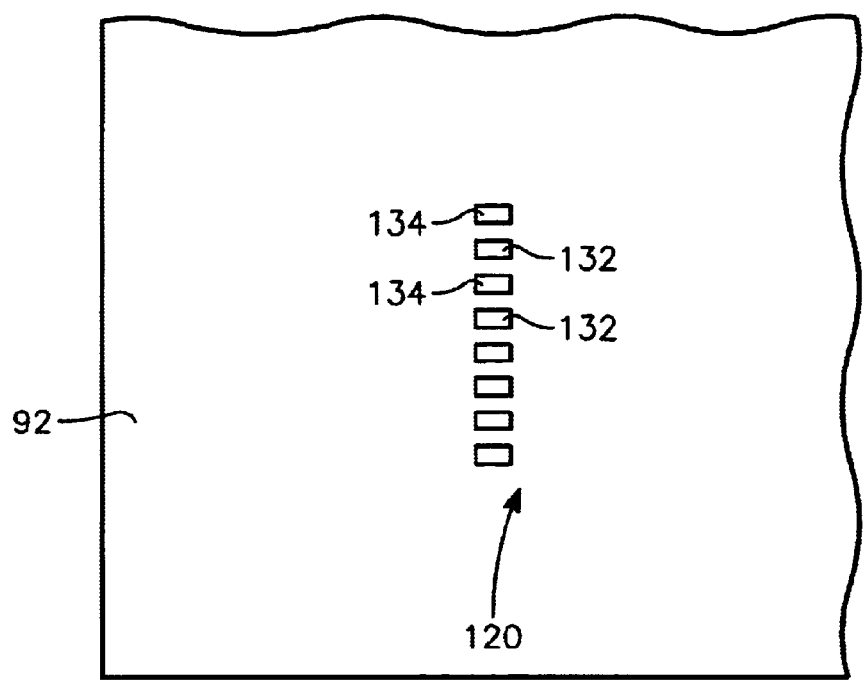
FIGS. 27 through 29 are plan views of the substrate of FIG. 26 in sequential steps as the optical router is being formed.

The multi-step processing of the stack structure of FIG. 26 will be explained with reference to a series of partial plan views of a portion of the substrate 92 as it is being developed. As illustrated in the plan view of FIG. 27, a photomask defines the areas of the semiconductor optical amplifiers 134 and the tunable lasers 132 of the wavelength converters 120. A wet etch sequence is performed which is first selective against the InGaAsP quantum well layer 220 and then selective against the underlying InP etch stop layer 218 to form the amplifiers 34 and lasers 132 in the 1550 nm layer 220. Only one receiving sector is illustrated. Virtually identical structure is formed in the transmitting sectors.

Figure 28:
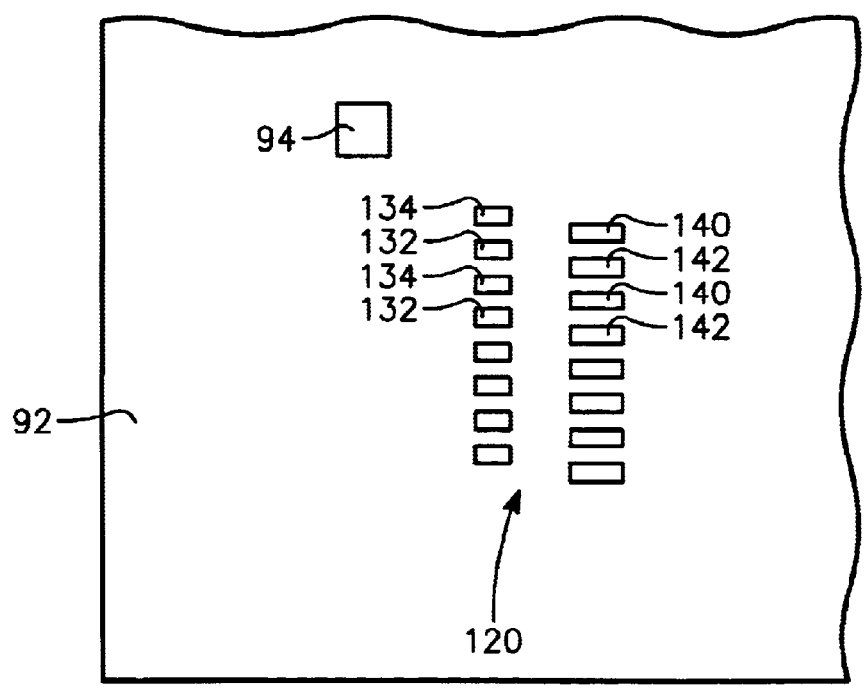

Another photomask is applied to define, as illustrated in the plan view of FIG. 28, the additional structure for the active avalanche regions 140, 142 (FIG. 12) of the wavelength converters 120 and for the 1310 nm detector 94. In the output sectors, the 1310 nm laser 96 has the same structure except for electrical leads. Another pair of selective wet etches forms the avalanche regions 138, 140 and detector 94 in the 1310 nm active layer 214. Another photolithographic step forms unillustrated sampled distributed Bragg gratings in the top p-type layer 222 on each end of the tunable lasers 132.

Figure 29:
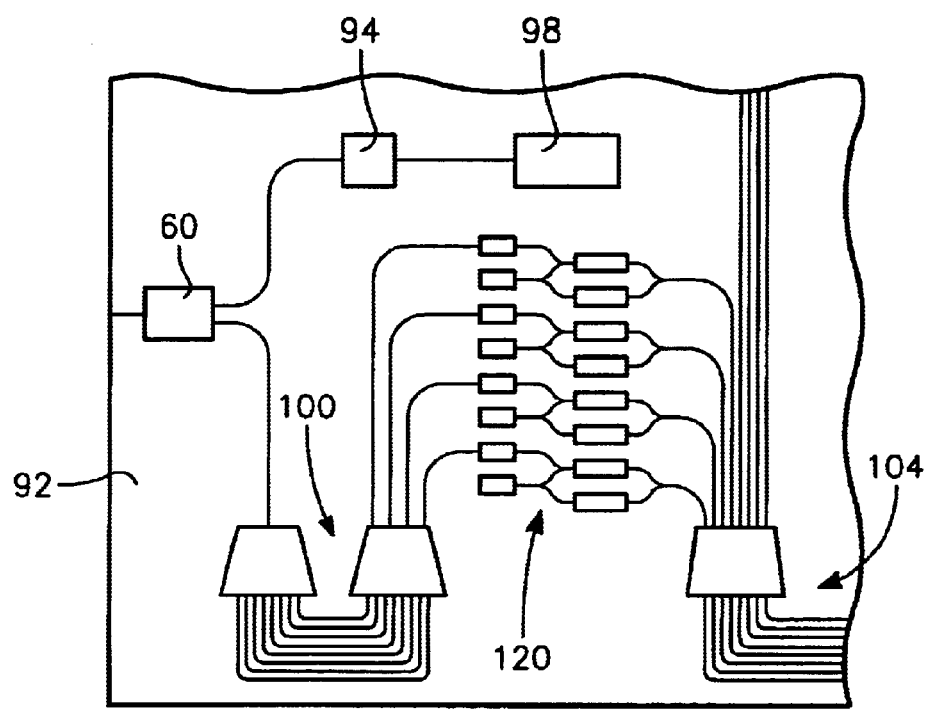

Yet another photomask is applied to laterally define in a silica hard mask, as illustrated in the plan view of FIG. 29, the MMI filter 60, the AWG free space regions for the input and output AWGs 100, 102, and the switching AWG 104, and the other planar active and passive waveguides within the AWGs and connecting other elements. More selective wet etching steps form these elements in the waveguide layer 212.

With the hard mask left in place, semi-insulating InP is regrown by metallorganic chemical vapor deposition (MOCVD) to bury the sidewalls of the lasers and waveguides. The hard mask is removed, an p-type InP is regrown, followed by p-type InGaAs. Semi-insulating InP is regrown to isolate the active regions. A p-type metallization is applied to the active contacts.

Thereafter, the MMIC transmitter and receiver chips 98, 99 are flip-chip bonded to the top of the substrate 92. It would be preferred to also flip chip bond the FPGA 124 at this stage, presently available FPGA are so large as to make this further integration difficult. An application specific integrated circuit (ASIC) may be specially designed to the required smaller size. Alternatively, as illustrated, electrical connections between the MMIC chips 98, 99, mounted active side up, and the associated detectors 94 and transmitters 96 may be done by bonding wires at a later stage.

Figure 30:
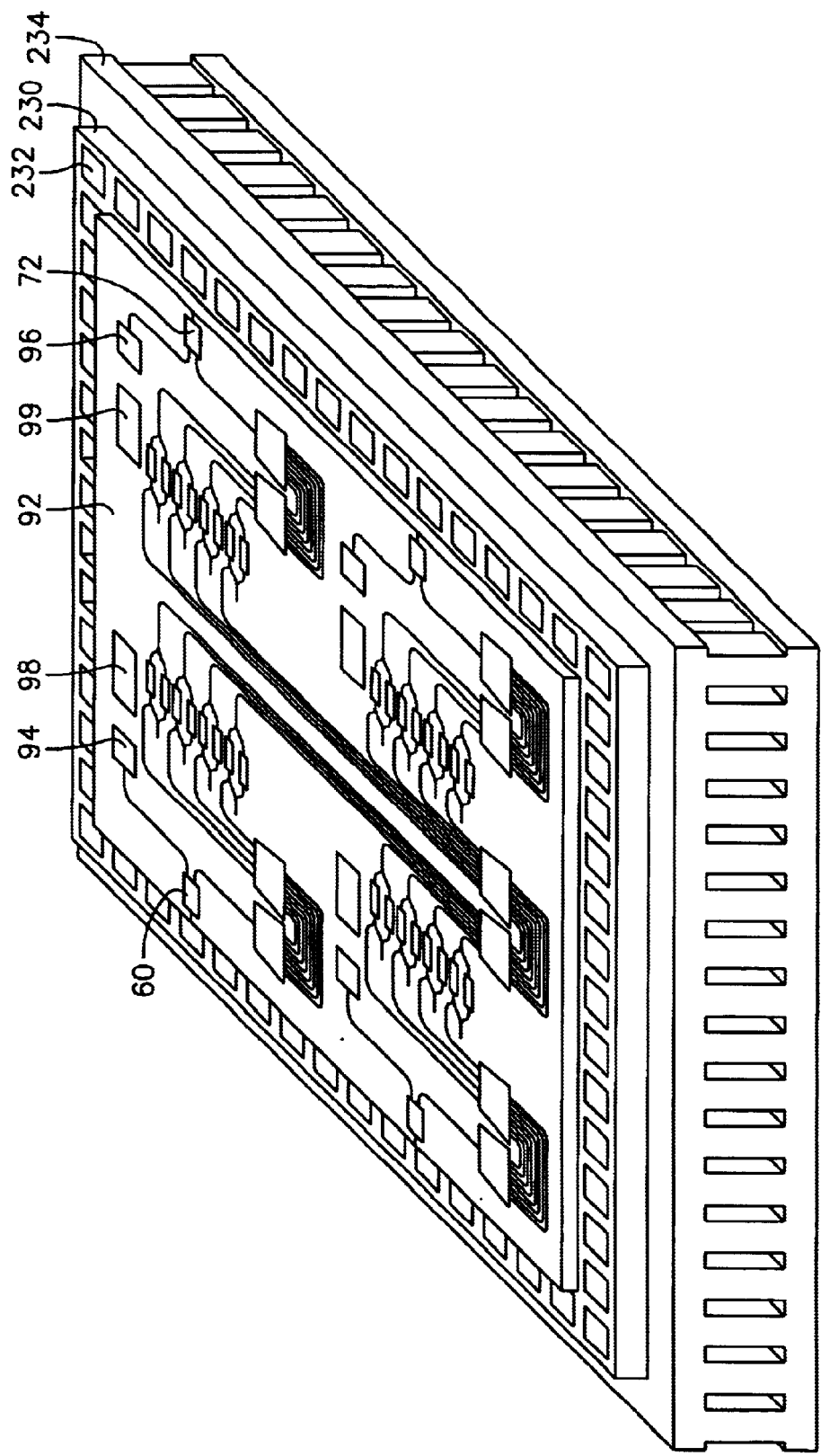
FIG. 30 is an orthographic view of the substrate of FIGS. 27–29 mounted on a base.
Figure 31:
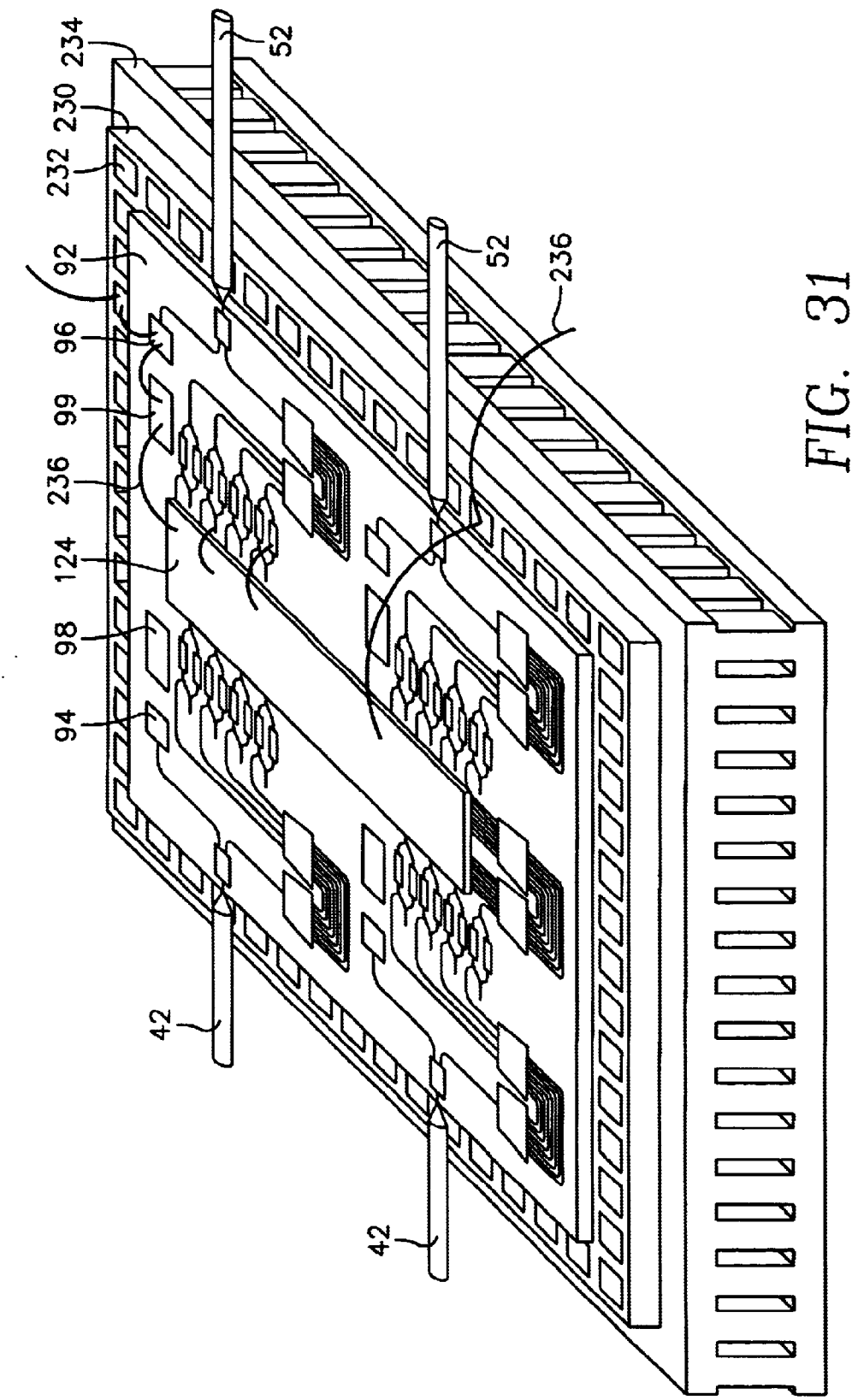
FIG. 31 is an orthographic view of the substrate and base of FIG. 30 with further wire bonding and connection to fibers.

The substrate 92 may be lapped down to 125 μm from the back and cleaved to chip size if required. A cleaved chip with attached MMICs is mounted on a silicon microbench 230, illustrated in the orthographic view of FIG. 30 on which are preformed a number of contact pads 232 surrounding the area of the chip. A silicon microbench is well known in opto-electronic systems and is typically formed of a silicon wafer having a surface layer of polysilicon. The chip 92 and microbench 230 are mounted on a single thermoelectric cooler 234, such as a Model CP 1.4-71-10L-1 available from Melcor, Inc. The thermoelectric cooler 234 controls the temperature of the opto-electronic chip 92 within a fairly narrow range so that the elements have the proper optical wavelength characteristics. As illustrated in the orthographic view of FIG. 31, the FPGA controller chip 124 is flip-chip bonded onto the chip 234 or may be maintained on a separate FPGA board within the the packaging. All of the router opto-electronics are mounted on the single thermoelectric cooler 234, vastly simplifying the design, reducing its size and cost, and easing the temperature control of many elements. As noted before, the illustrated sizes and placment of the MMIC electronics 98, 99 and FPGA 124 do not reflect the preferred flip-chip solder bump contacts.

The thermoelectric cooler 234 and attached structure is placed within the packaging. Wire bonds 236 are made between the FPGA 124, the 1310 nm detectors and lasers, the avalanche regions, the optical amplifiers, the tunable lasers, the contact pads, and the exterior of the system through the packaging. Optionally, the MMIC transmitter and receiver chips may be bonded to metallizations or interconnects associated with some of the active elements on the chips, particularly, the 1310 nm detectors and lasers, and provide the required electrical contacts. The ends of the input and output fibers 42, 52, which number four each in the base design, have tapered tips shaped as lenses to match the planar waveguides and to reduce the size of their cladding, typically 125 μm in diameter, so that their cores can be juxtaposed to the input and output planar waveguides on the chip 92. The fibers 42, 52 are fixed in these positions by structure attached to the silicon microbench 232.

In an alternative embodiment, the silicon microbench is replaced by a silica photonic lightwave circuit (PLC) and the chip 92 is fabricated in five separate portions. A first section provides the demultiplexing and includes the MMI splitter, the input AWGS, and associated planar waveguides. A second section provides the input wavelength conversion and includes the photodetectors, the tunable lasers, and the wavelength converters as well as some planar waveguides. A third section performs the wavelength-selective switching and includes the switching AWG and associated waveguides. The fourth section provides the output wavelength conversion and is quite similar to the second portion except for the functional differentiation between a photodetector and a laser diode. The fifth section performs the multiplexing and is quite similar to the first section. The separate chips are easier to fabricate, and spot-size transformers placed on the photonic lightwave circuit can be used at the interface between waveguides of different sections.

Although it is preferred that the opto-electronics including the detector, transmitting lasers, and wavelength converters including the tunable lasers and active layers be formed in the same substrate as the passive optics, the technology is difficult. Therefore, some or all of the opto-electronics may be formed in separate chips that are thereafter bonded to the principal optical chip. Such heterostructure integration reduces the complexity and improves the yield.

Figure 32:
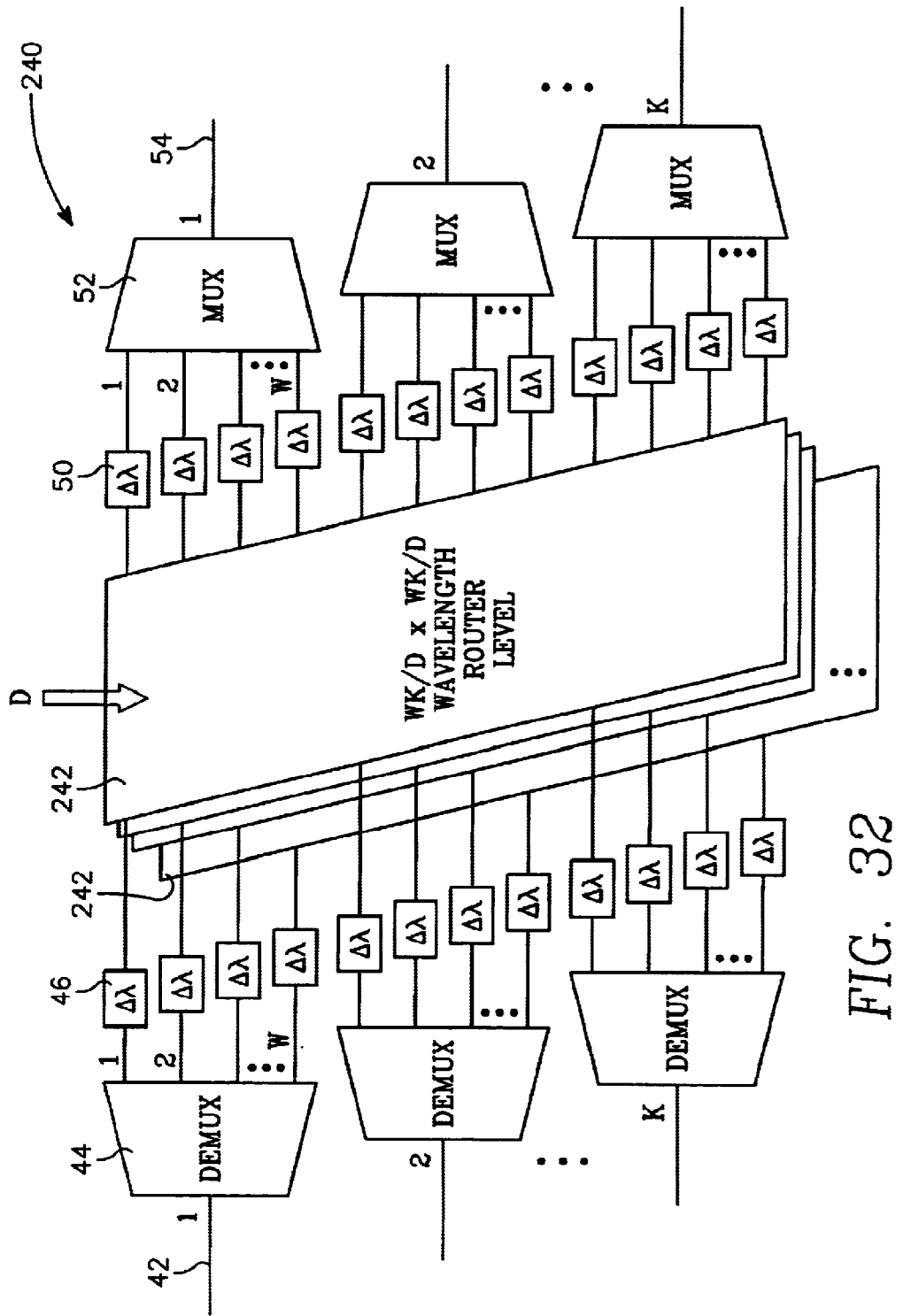
FIG. 32 is a schematic diagram of an optical router utilizing multiple parallel arrayed waveguide wavelength routers of reduced size.

The switching AWG 104 presents the most challenges in fabricating the passive portion of the circuit because it needs KW input and KW output ports. Further, the tunable lasers on the input side need to be tuned to KW switching wavelengths. These design problems can be significantly reduced by a router 240 schematically illustrated in FIG. 32 in which the single switching AWG is replaced by D levels of a reduced size wavelength routers 242. Each router level 242 has WK/D input ports and WK/D output ports. Furthermore, the input wavelength converters 46 need to be tunable to only WK/D separate wavelengths. A similar relaxation is obtained for the output wavelength converters 50. The illustrated router 240 is not strictly blocking because the path from any input channel to any output channel is constrained and another existing connection may block the desired path. However, the degree of blocking is reduced in the case of wavelength routing because the switching wavelength as well as the output wavelength may be picked from any wavelengths then available in the particular router level 242 or selected output fiber 52.

Figure 33:
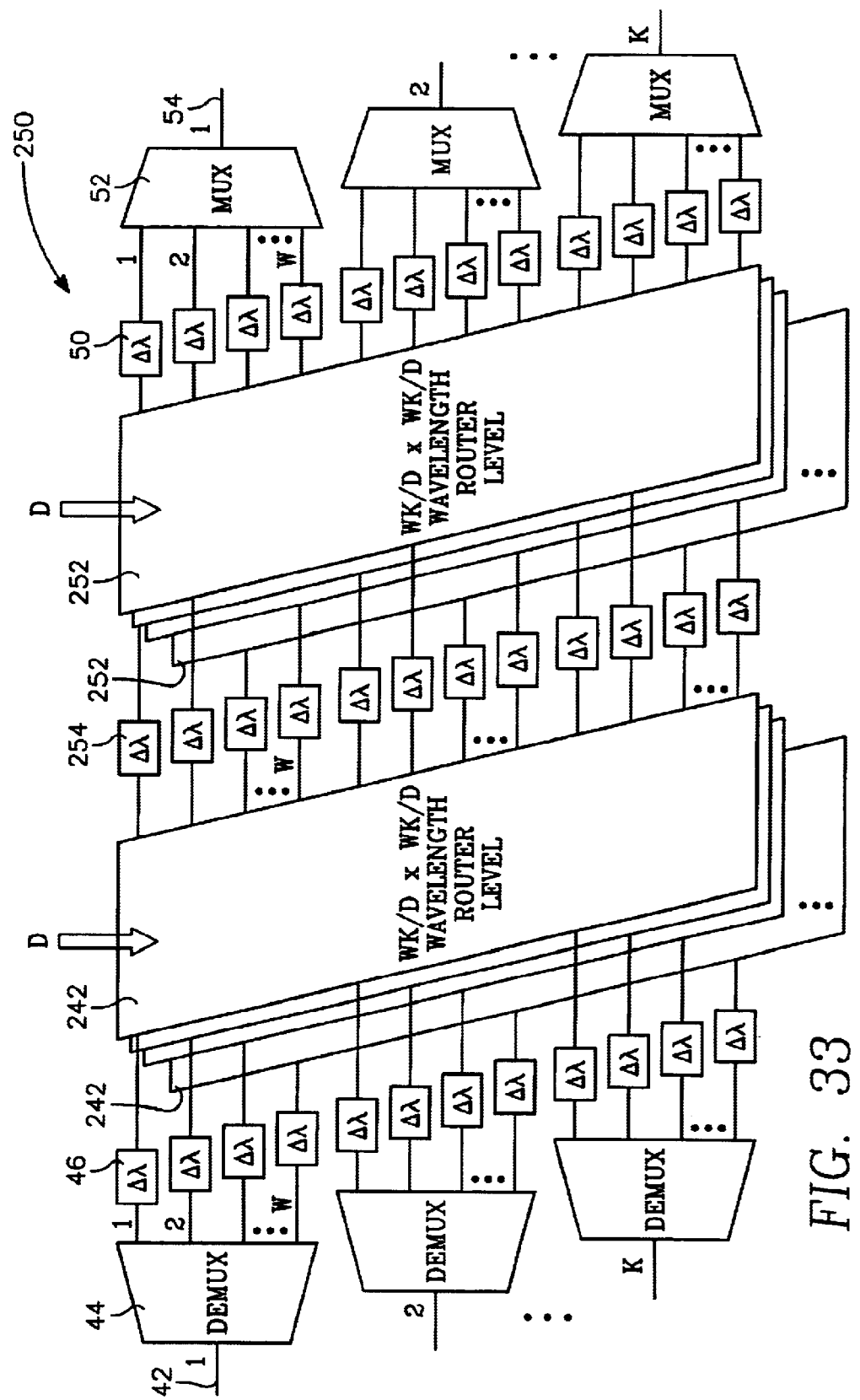
FIG. 33 is a schematic diagram of an optical router utilizing multiple stages of the parallel arrayed waveguide wavelength routers of FIG. 32.

The blocking can be substantially further reduced by a multi-stage router 250 schematically illustrated in FIG. 33 in which D levels of second wavelength routers 252 of substantially the same design as the first router levels 242 are interposed between the first-stage router levels 242 and the output wavelength converters 50. Intermediate wavelength converters 254 interposed between the first router levels 242 and the second router levels 252 and controlled by the switch controller 66 of FIG. 5 selectively convert the optical signals between any of the KW/D switching wavelengths. Further, the outputs of one level of the first router levels 242 should be connected to inputs of another level of the second router levels 252. This design could be further extended to additional stages of router levels to produce a purely non-blocking Clos type of switching network, but this complexity seems unnecessary in view of the flexibility in selecting switching and output wavelengths and their use in TCP/IP networks, in which some packet loss is allowed.

The multi-level reduced sized wavelength routers can be fabricated in a stacked structure of waveguides in a process described in the '384 application.

Although the invention has been described with reference to arrayed waveguide gratings, other types of multiplexers, demultiplexers, and wavelength routers may be employed with different aspects of the invention. Furthermore, the wavelength converters are not limited to the described types.

The many aspects of the invention allow the economical fabrication and operation of an optical router of very high capacity. In particular, all or nearly all opto-electronics are preferably also the electronic components can be formed in or bonded to one substrate heat sunk to a single thermoelectric cooler. The wavelength-based switching reduces the level of contention and minimizes latency at the router node. Few restrictions are imposed on the format of the packet being switched, thus facilitating a multi-protocol router at little or no added cost and complexity.

What is claimed is:

1. An integrated optical switching device comprising:
   a substrate;
   a plurality K of first arrayed waveguide gratings formed in said substrate and configured as optical demultiplexers each including at least one first input and W first outputs;
   a plurality K of second arrayed waveguide gratings formed in said substrate and configured as optical multiplexers each including at least W second inputs and one second output;
   a third arrayed waveguide grating formed in said substrate and having WK third inputs and WK third outputs;
   a plurality WK of first wavelength converters at least partially formed in said substrate between respective ones of said first outputs and said third inputs and converting a wavelength of a first optical input signal while maintaining it in optical form; and
   a plurality WK of second wavelength converters at least partially formed in said substrate between respective ones of said third outputs and said second inputs and converting a wavelength of a second optical input signal while maintaining it in optical form.

2. The optical switching device of claim 1, wherein said substrate includes an InP base and semiconductor layers epitaxially formed thereover.

3. The optical switching device of claim 1, wherein said first and second wavelength converters each include an electronically modulated Mach-Zehnder interferometer including active regions formed in said substrate.

4. The optical switching device of claim 1, wherein said substrate is bonded to a single thermoelectric cooler.

5. The optical switching device of claim 3, wherein said first and second wavelength converters each include a tunable laser.

6. The optical switching device of claim 5, wherein said tunable lasers are formed in said substrate.

7. The optical switching device of claim 3, further comprising at least one electronic chip bonded to said substrate and electrically connected to said active regions and said active regions.

8. The switching device of claim 1, wherein said first wavelength converters can change a wavelength in less than 450 ns.

9. The switching device of claim 1, wherein said first wavelength converters operate in response to information contained in a packet to thereby switch said packet through said third arrayed waveguide grating.

10. An optical router, comprising:
    a plurality K of optical splitters wavelength dividing a received optical signal into a first splitter port for wavelengths within a first silica fiber band and into a second splitter port for wavelengths within a different second silica fiber band;
    a plurality K of optical detectors receiving and detecting optical signals from respective ones of said first splitter ports;
    a plurality K of first arrayed waveguide gratings each including a first input port receiving optical signals from respective ones of said second splitter ports and further including at least W first output ports;
    a second arrayed waveguide grating including WK second input ports optically connected to respective ones of said first output ports and further including WK second output ports;

a plurality K of third arrayed waveguide gratings each including W third input ports optically connected to respective ones of said second output ports and further including a third output ports;

a plurality K of lasers emitting light at a wavelength within said first silica fiber band; and a plurality K of optical combiners and each having a first combiner input port receiving radiation from a respective one of said lasers and a second combiner input port connected to respective ones of said third output ports and further including an combiner output port output radiation received on said first and second combiner input ports.

11. The router of claim 10, further comprising;

WK tunable first wavelength converters disposed between respective pairs of said first output ports and said second input ports; and WK tunable second wavelength converters disposed between respective pairs of said second output ports and said third input ports.

12. The router of claim 11, further comprising a substrate in which said dividers, said combiners, and said first, second and third arrayed waveguides are formed.

13. The router of claim 10, further comprising a substrate in which said dividers, said combiners, and said first and second arrayed waveguides are formed.

14. An optical router, comprising:

a plurality K of first arrayed waveguide gratings arranged in sectors in a first substrate and wavelength selectively connecting a respective first input port to a plurality of respective first output ports;

a plurality K of opto-electronic circuitries arranged in said sectors each receiving optical inputs from said first output ports of a respective one of said first arrayed waveguide gratings and including at least one control electrode;

a second arrayed waveguide grating receiving optical inputs from all of said opto-electronic circuitries; and a plurality of electronic control circuits formed in respective second substrates, bonded to said first substrate within respective ones of said sectors and connected to respective ones of said control electrodes.

15. The router of claim 14, wherein said first substrate comprises an InP base and said second substrates comprise GaAs bases.

16. The router of claim 15, further comprising an electronic silicon circuit bonded to said first substrate and connected to all of said electronic control circuits.

17. An optical router, comprising:

a substrate;

a plurality K optical demultiplexers comprising first arrayed waveguide gratings formed in said substrate and each including at least one first input and W first outputs, wherein W is greater than one;

a plurality K optical multiplexers comprising second arrayed waveguide gratings formed in said substrate and each including at least W second inputs and one second output;

a wavelength router comprising a third arrayed waveguide grating formed in said substrate and having WK third inputs and WK third outputs;

a plurality WK of first wavelength converters connected between respective ones of said first outputs and said third inputs; and a plurality WK of second wavelength converters connected between respective ones of said third outputs and said second inputs.

18. The router of claim 17, wherein said first and second wavelength converters are at least partially formed in said substrate.

19. An integrated optical switching device, comprising:

a substrate;

a plurality K of first arrayed waveguide gratings formed in said substrate and configured as optical demultiplexers each including at least one first input and W first outputs;

a plurality K of second arrayed waveguide gratings formed in said substrate and configured as optical multiplexers each including at least W second inputs and one second output;

a third arrayed waveguide grating formed in said substrate and having WK third inputs and WK third outputs;

a plurality WK of first wavelength converters at least partially formed in said substrate between respective ones of said first outputs and said third inputs; and a plurality WK of second wavelength converters at least partially formed in said substrate between respective ones of said third outputs and said second inputs.

20. The optical switching device of claim 19, said substrate is bonded to a single thermoelectric cooler.

21. An integrated optical switching device, comprising:

a first substrate including an InP base and having formed therein a plurality of first arrayed waveguide gratings, a plurality of second arrayed waveguide gratings, a third arrayed waveguide array grating disposed physically and operatively between (1) said first array waveguide gratings and (2) said second array waveguide gratings, and a plurality of opto-electronic portions disposed physically and operatively between said (1) third waveguide grating and (2) said first and second waveguide gratings;

at least one second substrate each including a GaAs base bonded to said first substrate and including first electrical circuitry electrically contacted to said opto-electronic portions; and an integrated circuit including a silicon base bonded to said at least one second substrate and including second electrical circuitry controlling said first electrical circuitry.

22. The optical switching device of claim 21, wherein said at least one second substrate includes a plurality of second substrates electrically contacted to respective ones of said opto-electronic portions.

* * * * *

UNITED STATES PATENT AND TRADEMARK OFFICE
CERTIFICATE OF CORRECTION

PATENT NO. : 6,768,827 B2  
DATED : July 27, 2004  
INVENTOR(S) : Yoo

It is certified that error appears in the above-identified patent and that said Letters Patent is hereby corrected as shown below:

Column 25,
Line 4, please delete the word, "ports" and replace with the word -- port --.

Signed and Sealed this

Sixteenth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,768,827 B2 Page 1 of 1
DATED : July 27, 2004
INVENTOR(S) : Yoo

It is certified that error appears in the above-identified patent and that said Letters Patent is hereby corrected as shown below:

<u>Column 1,</u>
Line 9, please add the following section,

-- GOVERNMENT LICENSE RIGHTS

This invention was made with United States Government support under Grant No. F30602-00-2-0543 awarded by the Air Force Office of Scientific Research. The United States Government has certain rights in the invention. --

Signed and Sealed this

Thirty-first Day of May, 2005

JON W. DUDAS
*Director of the United States Patent and Trademark Office*